United States Patent
Yada

(10) Patent No.: US 11,249,694 B2
(45) Date of Patent: Feb. 15, 2022

(54) NON-TRANSITORY STORAGE MEDIUM STORING INSTRUCTIONS EXECUTABLE BY COMMUNICATION APPARATUS, THE COMMUNICATION APPARATUS, AND LIST CREATING METHOD

(71) Applicant: Brother Kogyo Kabushiki Kaisha, Nagoya (JP)

(72) Inventor: Yuki Yada, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/793,548

(22) Filed: Feb. 18, 2020

(65) Prior Publication Data
US 2020/0272373 A1 Aug. 27, 2020

(30) Foreign Application Priority Data

Feb. 22, 2019 (JP) .............................. JP2019-030340

(51) Int. Cl.
*G06F 3/12* (2006.01)
*H04L 29/08* (2006.01)
(Continued)

(52) U.S. Cl.
CPC .......... *G06F 3/1205* (2013.01); *G06F 3/1232* (2013.01); *G06F 8/65* (2013.01);
(Continued)

(58) Field of Classification Search
CPC ........ G06F 3/1205; G06F 8/65; G06F 16/248; G06F 16/2379; G06F 3/1232;
(Continued)

(56) References Cited

U.S. PATENT DOCUMENTS

| | | | | |
|---|---|---|---|---|
| 7,840,978 B2* | 11/2010 | Choe | .................. | H04N 21/4351 725/39 |
| 2010/0177660 A1* | 7/2010 | Essinger | ................. | H04W 4/50 370/254 |

(Continued)

FOREIGN PATENT DOCUMENTS

JP 2000-181641 A 6/2000

*Primary Examiner* — Miya J Williams
*Assistant Examiner* — Darryl V Dottin
(74) *Attorney, Agent, or Firm* — Burr & Brown, PLLC

(57) ABSTRACT

A non-transitory storage medium stores instructions executable by a processor of a communication apparatus configured to communicate with a function executing device. The communication apparatus includes a communication device and a database. The instructions, when executed by the processor, cause the communication apparatus to execute: a determination processing in which the communication apparatus determines whether there is a device list in the database at an initial start of the communication apparatus, the device list being a list of at least one function executing device; a search processing in which the communication apparatus searches for the function executing device communicable with the communication apparatus when the communication apparatus determines in the determination processing that there is not the device list in the database; and a creation processing in which the communication apparatus creates the device list based on a result of the search processing.

15 Claims, 35 Drawing Sheets

(51) Int. Cl.
*G06F 8/65* (2018.01)
*G06F 16/248* (2019.01)
*G06F 16/23* (2019.01)
*H04L 67/51* (2022.01)

(52) U.S. Cl.
CPC ........ *G06F 16/2379* (2019.01); *G06F 16/248* (2019.01); *H04L 67/16* (2013.01); *G06F 3/12* (2013.01); *G06F 3/1204* (2013.01)

(58) Field of Classification Search
CPC .... G06F 3/1253; G06F 3/1229; G06F 3/1203; G06F 3/1226; G06F 3/1285; G06F 3/12; G06F 3/1204; H04L 67/16; H04L 69/328
USPC ...................................................... 358/1.15
See application file for complete search history.

(56) References Cited

U.S. PATENT DOCUMENTS

| | | | |
|---|---|---|---|
| 2010/0309501 A1* | 12/2010 | Hagiuda | H04N 1/00204 358/1.13 |
| 2013/0024420 A1* | 1/2013 | Rao | G06F 16/1787 707/610 |
| 2017/0017368 A1* | 1/2017 | Maheshwari | G06F 3/0484 |

* cited by examiner

FIG.15

| Detail Informations | | |
|---|---|---|
| | Informations: | |
| [printer image] | Node Name | BR00000000 |
| MFC-L9570CDW Series | Serial No. | B-000-000-001 |
| 192.168.100.14 | MAC Address | XX:XX:XX:XX |
| Ready | Location | Flor 3 |
| | Contact | 080-0000-0000 |
| Supply Level | Total Page Count | 10,000 pages |
| | Firmware Version(Main) | 10.5 |
| | Firmware Version(Sub) | 10.5 |
| | Updated | 2018/10/10 12:00 |
| | Discovered | 2018/10/01 12:00 |
| | Activated Functions | |
| | CustomUI Version | |
| | CustomUI Write Lock | |
| | Solution Switch | |
| | IF Lock | Off |

OK

NON-TRANSITORY STORAGE MEDIUM STORING INSTRUCTIONS EXECUTABLE BY COMMUNICATION APPARATUS, THE COMMUNICATION APPARATUS, AND LIST CREATING METHOD

CROSS REFERENCE TO RELATED APPLICATION

The present application claims priority from Japanese Patent Application No. 2019-030340, which was filed on Feb. 22, 2019, the disclosure of which is herein incorporated by reference in its entirety.

BACKGROUND

The following disclosure relates to a technique of creating a device list that is a list of at least one communicable function executing device.

There is known an information processing device connected to a plurality of printers over a network and including a designating portion for designating a group. The information processing device displays a list of icons indicating printers classified in the group designated by the designating portion.

There is also known a technique of transmitting information relating to a printer indicated by one of the icons displayed in list form, to another information processing device via a network.

SUMMARY

In this conventional information processing device, however, it is unknown when the printer classified in the group is searched and when the information relating to the printer indicated by one of the icons displayed in list form is obtained. This makes it impossible to efficiently search for the printer and obtain information relating to the printer at an optimum timing.

Accordingly, an aspect of the disclosure relates to a technique of searching for a function executing device at an optimum timing to efficiently create a device list.

In one aspect of the disclosure, a non-transitory storage medium stores a plurality of instructions executable by a processor of a communication apparatus configured to communicate with a function executing device. The communication apparatus includes a communication device and a database. The plurality of instructions, when executed by the processor, cause the communication apparatus to execute: a determination processing in which the communication apparatus determines whether there is a device list in the database at an initial start of the communication apparatus, the device list being a list of at least one function executing device; a search processing in which the communication apparatus searches for the function executing device communicable with the communication apparatus when the communication apparatus determines in the determination processing that there is not the device list in the database; and a creation processing in which the communication apparatus creates the device list based on a result of the search processing.

In another aspect of the disclosure, a communication apparatus includes: a communication device configured to communicate with a function executing device; a database; and a controller configured to execute: a determination processing in which the controller determines whether there is a device list in the database at an initial start of the communication apparatus, the device list being a list of at least one function executing device; a search processing in which the controller searches for the function executing device communicable with the communication apparatus when the controller determines in the determination processing that there is not the device list in the database; and a creation processing in which the controller creates the device list based on a result of the search processing.

Yet another aspect of the disclosure relates to a list creating method for a communication apparatus configured to communicate with a function executing device. The communication apparatus includes a communication device and a database. The list creating method includes: determining whether there is a device list in the database at an initial start of the communication apparatus, the device list being a list of at least one function executing device; searching for the function executing device communicable with the communication apparatus when it is determined that there is not the device list in the database; and creating the device list based on a result of the searching.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 15 is a view illustrating one example of a detail-information window relating to the selected MFP;

EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure.

System Configuration

Figure 1:
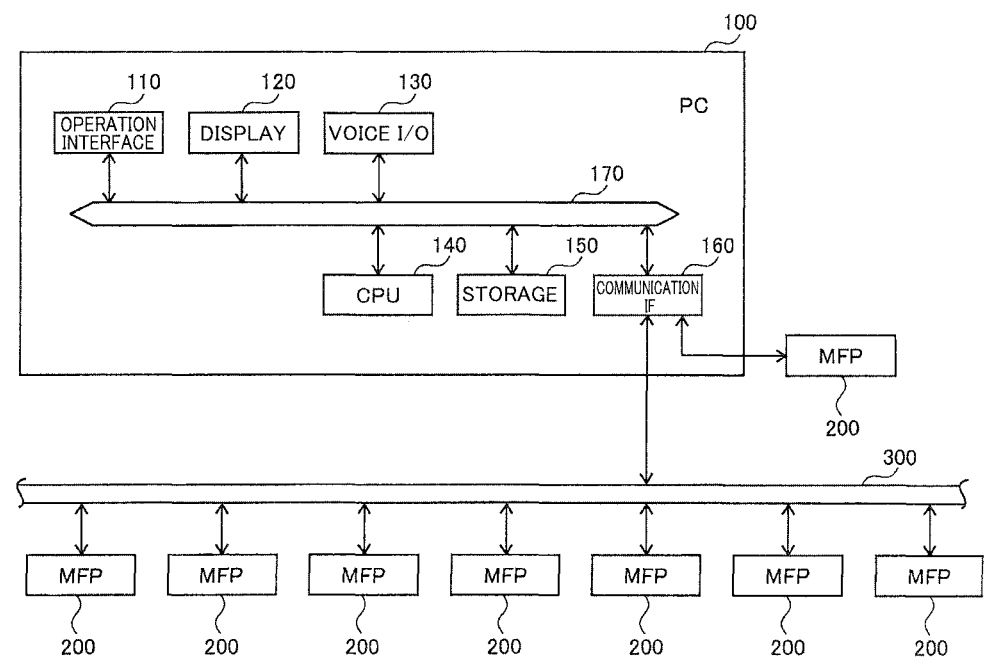
FIG. 1 is a schematic view of a personal computer configured to execute an information processing program according to one embodiment, and multi-function peripherals (MFPs) connected to the personal computer communicably.

FIG. 1 is a schematic view of (i) a personal computer (PC) 100 configured to execute an information processing program according to one embodiment, and (ii) multi-function peripherals (MFPs) 200 connected to the PC 100 communicably.

The PC 100 includes an operation interface 110, a display 120, a voice input/output (I/O) interface 130, a central processing unit (CPU) 140, a storage 150, and a communication interface 160.

The operation interface 110 typically includes a keyboard and a mouse.

The display 120 includes: a display device such as a liquid crystal display and an organic EL display; and a drive circuit for driving the display device. In the case where a display using a touch screen is used as the display 120, the user can press an input button on the screen to perform an input operation. Accordingly, the display 120 also functions as the operation interface 110 in this case.

The voice I/O interface 130 includes a microphone, a speaker, and a voice processing circuit.

The CPU 140 executes various application programs including the information processing program according to the present embodiment, and firmware, for example. It is noted that each of the application programs will be hereinafter referred to as "application".

The storage 150 includes a read only memory (ROM), a random access memory (RAM), a hard disk drive (HDD), a solid state drive (SSD), and an optical disc drive. The ROM stores firmware and various kinds of data. The RAM is used as a temporarily storage device which loads the application programs and which is used for the CPU 140 to execute various processings.

A storage 108 stores an operating system (OS), the information processing program according to the present embodiment, and other various applications and the data, for example.

The various applications may be downloaded from an external server, not illustrated, via the communication interface 160. It is noted that applications may be downloaded from an external device, not illustrated, via a universal-serial-bus (USB) interface provided in the PC 100.

The information processing program according to the present embodiment is an application according to which the PC 100 is capable of displaying statuses of a plurality of functions (specifically, a printing function, a scanner function, and a facsimile function) of each of the MFPs 200 and capable of managing the functions of the MFPs 200.

The communication interface 160 is configured to connect the PC 100 to a communication network 300 and connect an external device to the PC 100. In the present embodiment, the communication network 300 is a wired or wireless local area network (LAN). Thus, the communication interface 160 is a local-area-network interface (LANIF) or a wireless-LAN interface (WLANIF). In the case where the wired LAN and the wireless LAN exist at the same time, the communication interface 160 includes both the LANIF and the WLANIF. The communication network 300 is not limited to the LAN and may be other types of networks such as the Internet. Examples of interfaces directly connecting the external device to the PC 100 include the USB interface and a Bluetooth (registered trademark) interface.

In the present embodiment, a plurality of the MFPs 200 are connected to the communication network 300. It is assumed that the MFPs 200 are of the same model manufactured by the same manufacture for easier understanding purposes in the present embodiment. However, the MFPs 200 may be manufactured by different manufactures and may be of different models manufactured by the same manufacture. In the present embodiment, the MFP is an example of a function executing device. However, the present disclosure is not limited to this, and any of a single printer, a scanner, and a copying machine may be used as the function executing device, and the MFP and any one or ones of the printer, the scanner, and the copying machine may exist at the same time.

A single MFP 200 is directly connected to the PC 100 without being connected via the communication network 300. This MFP 200 is connected to the PC 100 using the USB interface in the present embodiment.

Configuration of Information Processing Program

The information processing program according to the present embodiment is installed in the storage 150 of the PC 100, e.g., the hard disk drive. The CPU 140 loads the contents of the information processing program into the RAM of the storage 150 to execute a background service 152 (see FIG. 2). When the user presses an icon, not illustrated, for instructing execution of the information processing program, the CPU 140 executes the information processing program in a presentation layer 151 (see FIG. 2).

Figure 2:
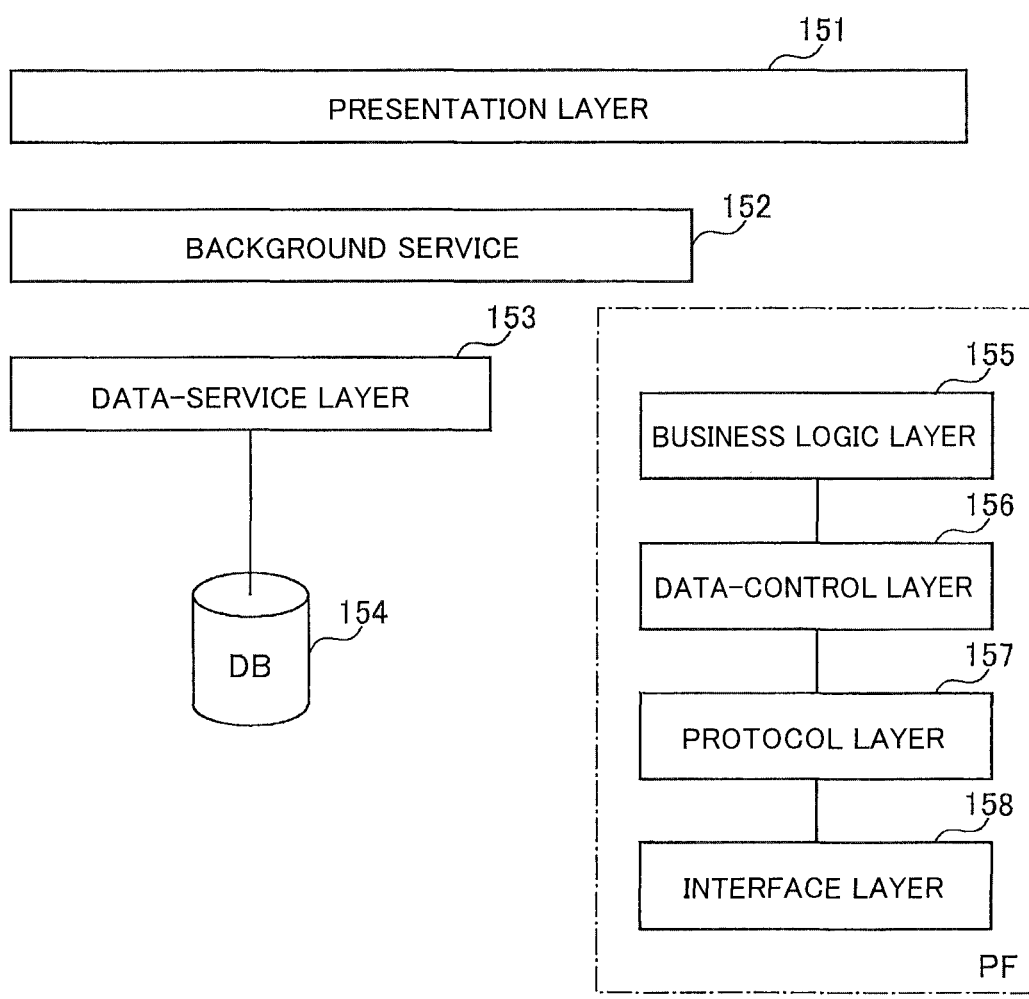
FIG. 2 is a block diagram illustrating a portion of one example of a configuration of the information processing program loaded into a storage of the personal computer in FIG. 1.
Figure 5:
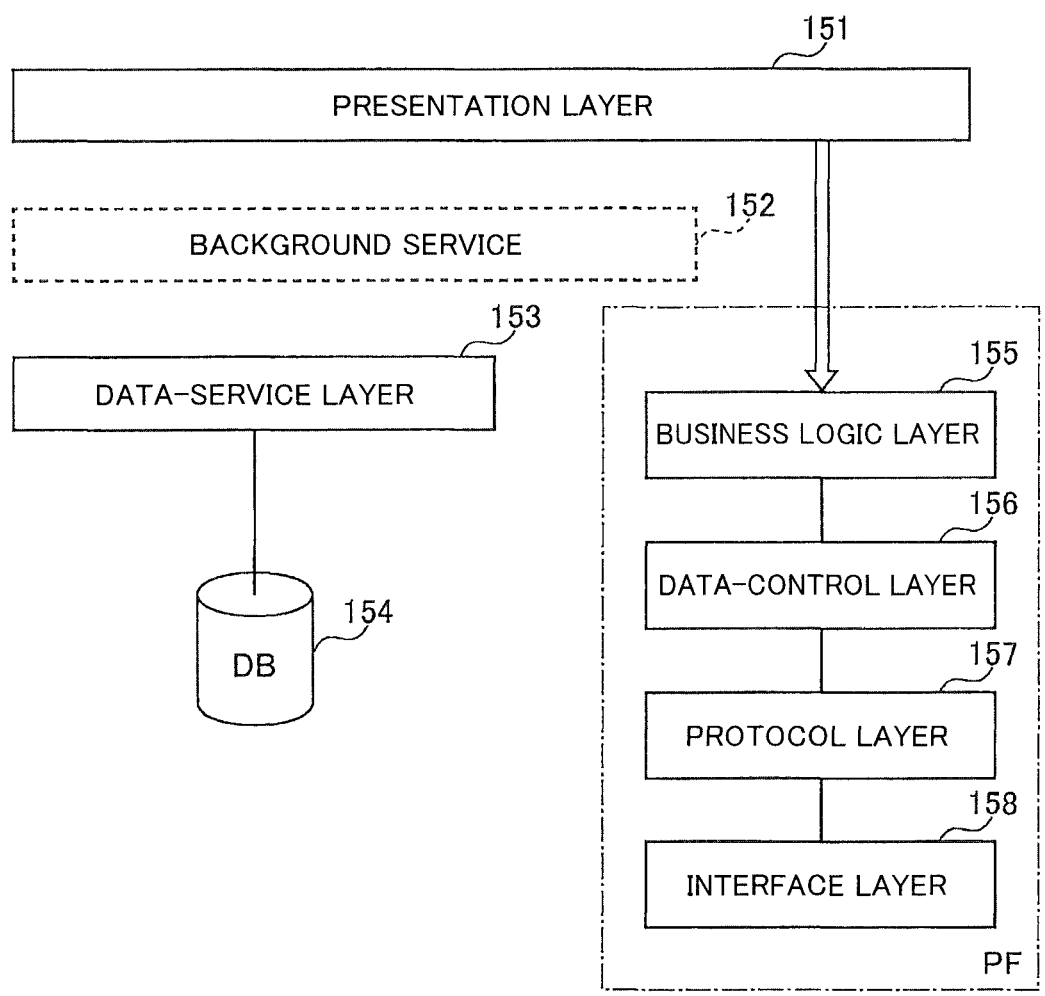
FIG. 5 is a block diagram illustrating a case where a background service is not installed when the information processing program in FIG. 2 is installed on the storage of the personal computer in FIG. 1.

FIG. 2 illustrates a portion of one example of the configuration of the loaded information processing program. As illustrated in FIG. 2, the information processing program has a multi-tier structure and includes the presentation layer 151, the background service 152, and a data-service layer 153 in order from the highest level layer toward the lowest level layer. A database 154 is connected to the data-service layer 153. A business logic layer 155, a data-control layer 156, a protocol layer 157, and an interface layer 158 are provided below the background service 152. The layers from the business logic layer 155 to the interface layer 158 may be hereinafter collectively referred to as "platform" (PF). It is noted that the block of the background service 152 covers only a portion of the block of the business logic layer 155. This is because access of the business logic layer 155 is performed via the background service 152 in some case and performed directly from the presentation layer 151 in another case (see FIG. 5).

The presentation layer 151 provides a graphical user interface (GUI) and manages parameters unique to this GUI. The CPU 140 executes the functions of the data-service layer 153 and the business logic layer 155 via the background service 152 and displays its results on the GUI.

The background service 152 is a module executable as a background service on the operating system. The background service 152 receives a request from the presentation layer 151 and maintaining the data-service layer 153. When updating data in the data-service layer 153, the CPU 140 calls the business logic layer 155 of the platform and stores its result into the data-service layer 153.

The data-service layer 153 provides application programming interfaces (APIs) for reading and writing data from and into the database 154 (and exclusion control in the reading and writing) and for adding and deleting data. The data-service layer 153 also manages device-action scenarios executable in the background service 152 and provides a system of notification between the presentation layer 151 and the background service 152. It is noted that the device-action scenario defines a procedure that is used when data is written into or read from the database 154.

The business logic layer 155 manages transactions of the data-control layer 156 and provides a device searching function.

The data-control layer 156 uses a management information base (MIB), a printer job language (PJL), JavaScript (registered trademark) Object Notation (JSON), and the like to provide a function for inputting and outputting data to and from the MFP 200.

The protocol layer 157 provides input and output of data to and from a USB port of the designated MFP 200 and provides input and output of data to and from the 9100th port according to the Transmission Control Protocol (TCP). The protocol layer 157 provides input and output of data according to the Simple Network Management Protocol (SNMP) of the designated MFP 200. The protocol layer 157 provides input and output of data according to the Hyper Text Transfer Protocol (HTTP) of the designated MFP 200 or a service.

The interface layer 158 is used in the case where a printer driver, a USB driver, a receptacle (socket), or the HTTP is used for input and output of data.

The database 154 stores various kinds of information relating to the MFPs 200 such as a list of the MFPs 200, an operating state of each of the MFPs 200, and logs.

Figure 3:
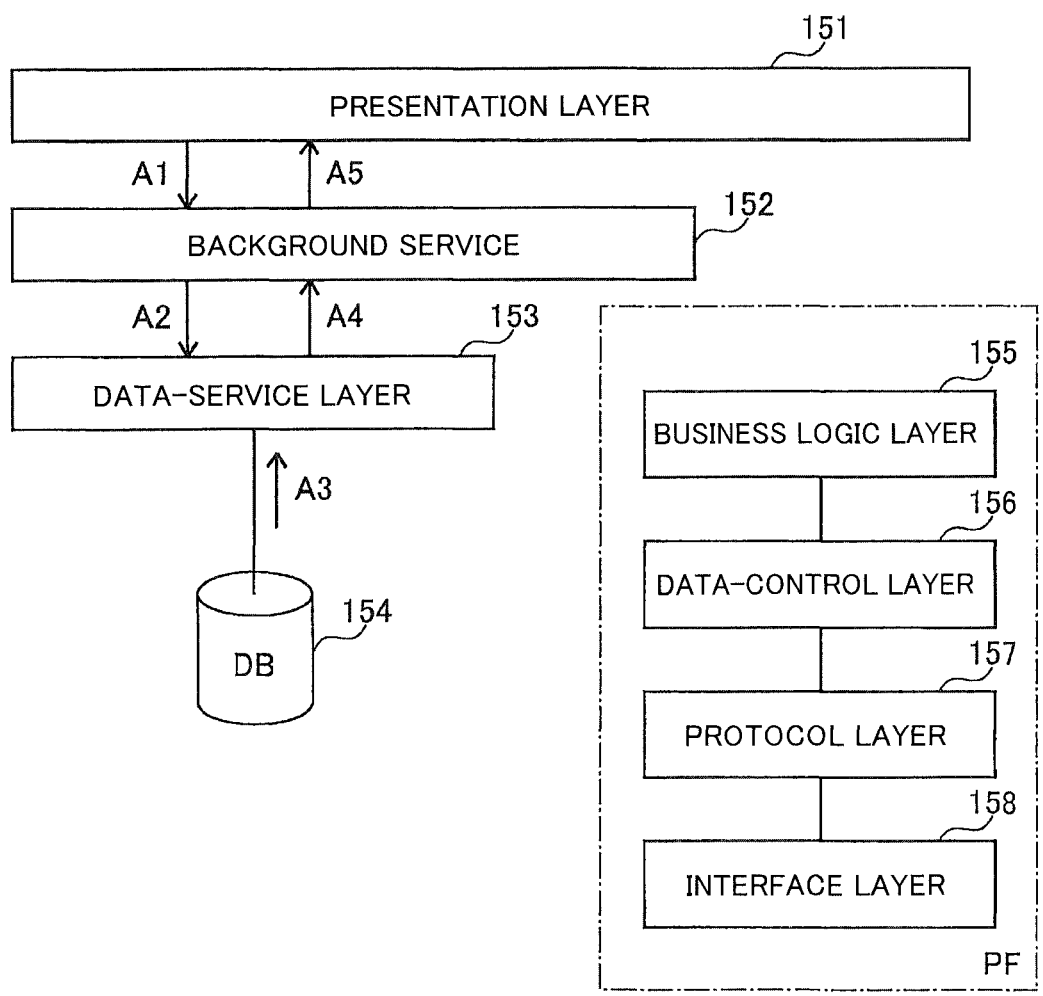
FIG. 3 is a view of one example of data transfer between a presentation layer and each of other layers and a database when the presentation layer constructs a user interface.

FIG. 3 illustrates one example of data transfer among the layers 151-153 and between each of the layers 151-153 and the database 154 when the presentation layer 151 constructs a user interface (UI). Each of arrows A1-A5 in FIG. 3 indicates a flow of data. The arrow A1 indicates a request of information managed in the data-service layer 153 from the presentation layer 151 to the background service 152. The arrow A2 indicates calling of the interface of the data-service layer 153. The arrow A3 indicates reading of the managed database from the database 154. The arrow A4 indicates a return of information read from the database as a reply. The arrow A5 indicates a return of the obtained information for the presentation layer 151 to construct the user interface.

Figure 4:
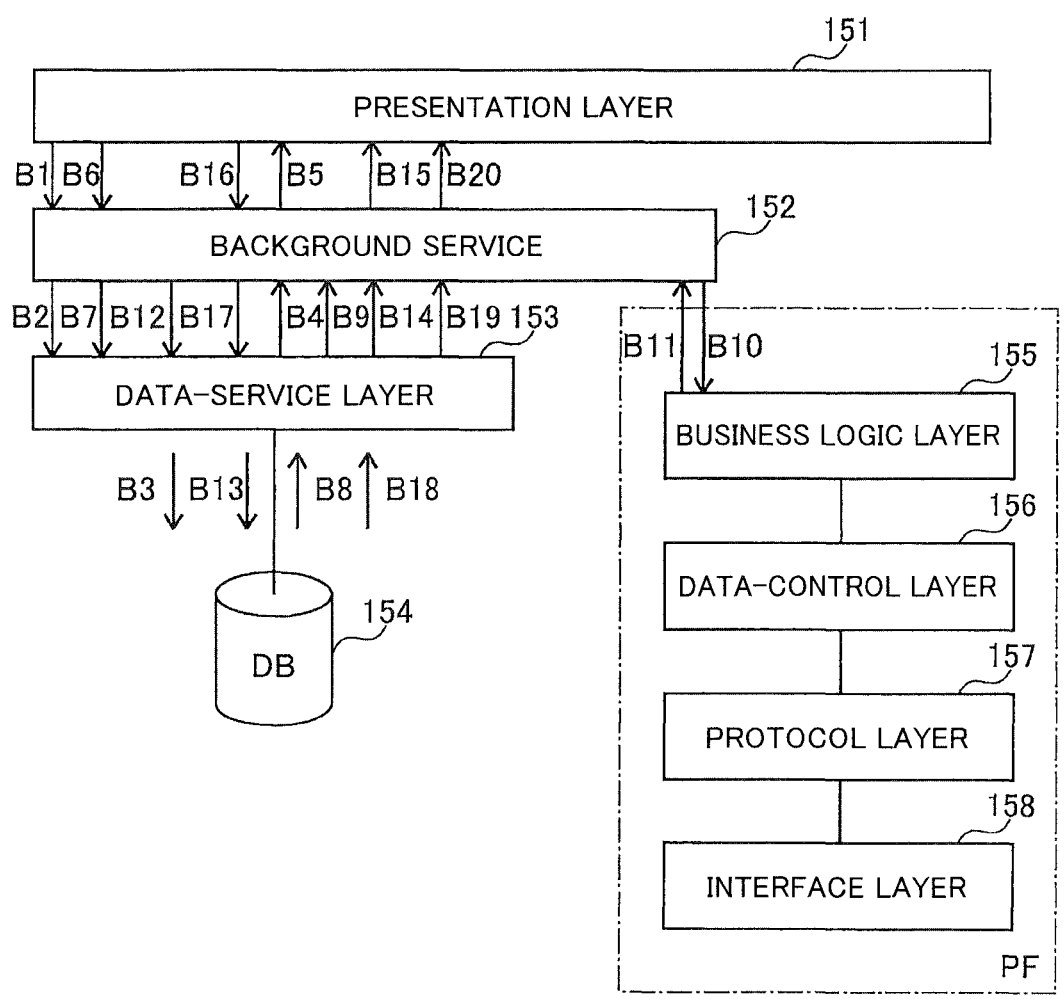
FIG. 4 is a view of one example of data transfer among the layers and between each layer and the database when updating device information.

FIG. 4 illustrates one example of data transfer among the layers 151-153, 155 and between each of the layers 151-153, 155 and the database 154 when updating device information. Each of arrows B1-B20 in FIG. 4 indicates a flow of data. The arrow B1 indicates a request of registration of the device-action scenario from the presentation layer 151 to the background service 152. The arrow B2 indicates calling of the interface of the data-service layer 153 and registration of the device-action scenario. The arrow B3 indicates writing of data into the database 154. The arrow B4 indicates notifying the database 154 of the completion of the writing. The arrow B5 indicates notifying the application, i.e., the information processing program according to the present embodiment, of the completion of the registration of the device-action scenario, via the presentation layer 151. The arrow B6 indicates requesting the background service 152, in response to an update of the device-action scenario, to reevaluate a device-action-scenario database that is a portion of the database 154 (to check whether there is a need for instant execution). The arrow B7 indicates requesting the data-service layer 153 to obtain the device-action scenario.

The arrow B8 indicates obtainment of information from the database 154. The arrow B9 indicates a return of information of a necessary device-action scenario. The arrow B10 indicates a request of execution to the business logic layer 155. The arrow B11 indicates a return of the result of the execution. The arrow B12 indicates a request of writing of data onto the database 154 based on the result of the execution. The arrow B13 indicates writing onto the database 154. The arrow B14 indicates notification of the completion of the writing. The arrow B15 indicates notifying the presentation layer 151 of the completion of the reevaluation of the device-action-scenario database. The arrow B16 indicates requesting the background service 152 to obtain the device-action scenario. The arrow B17 indicates calling of the interface of the data-service layer 153 and obtainment of the device-action scenario. The arrow B18 indicates reading of data from the database 154. The arrow B19 indicates a return of the data obtained from the database 154. The arrow B20 indicates a return of the obtained device-action scenario to the presentation layer 151.

Device-List Creating Process

Figure 8:
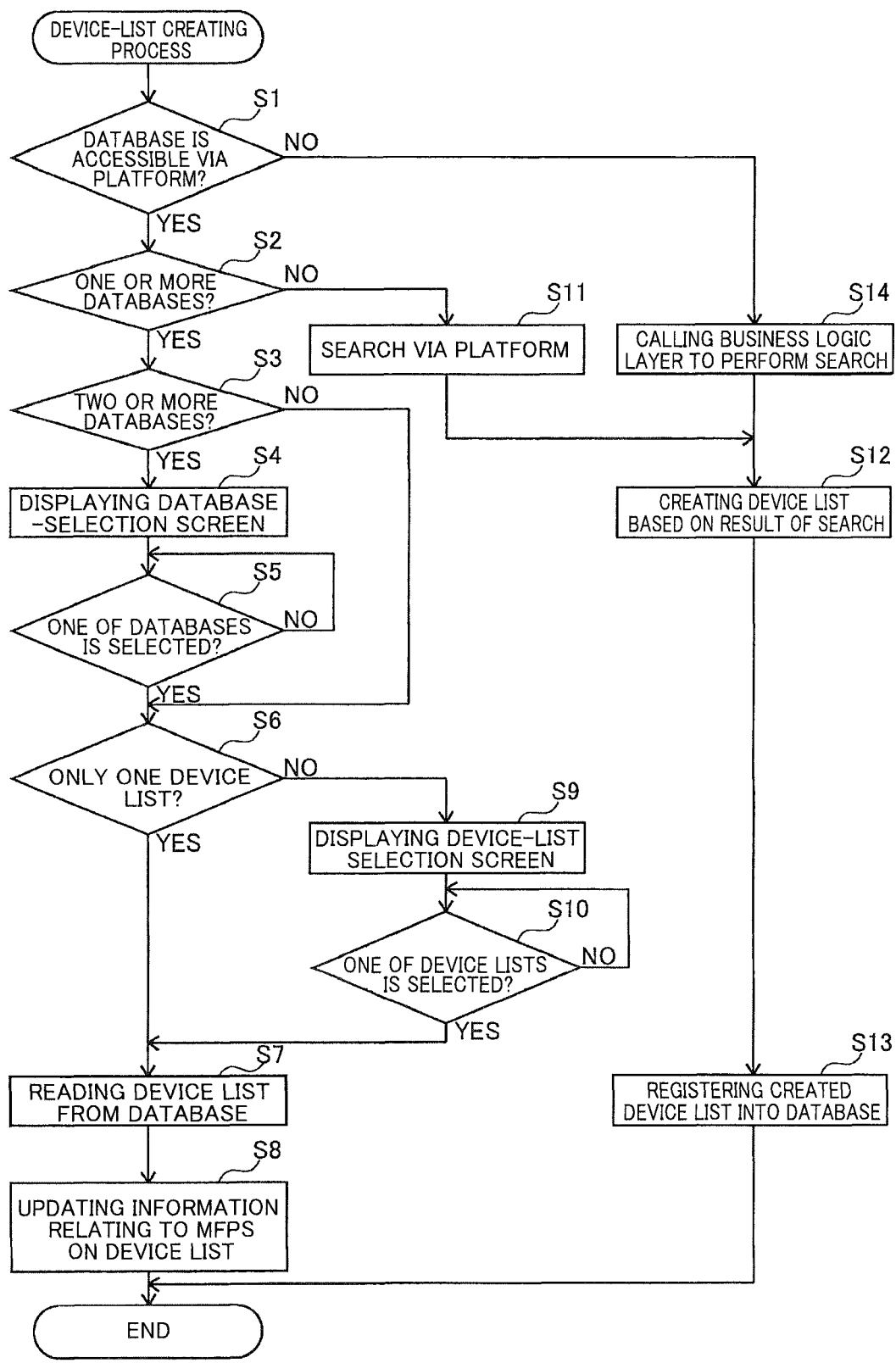
FIG. 8 is a flowchart representing a procedure of a device-list creating process that is executed by the personal computer in FIG. 1, especially, a central processing unit (CPU)

There will be next described, with reference to FIG. 8, a device-list creating process that is executed by the PC 100, particularly, the CPU 140. It is noted that a device list is a list of the MFPs 200 communicable with the PC 100.

The present device-list creating process is executed in initial start of the PC 100. Specifically, the initial start is at least one of the first start of the PC 100 after a configuration of the information processing program according to the present embodiment, the first start of the PC 100 after an update of software of the information processing program according to the present embodiment, and the first start of the PC 100 after deletion of the database 154.

The flow of the device-list creating process in FIG. 8 begins with S1 at which the CPU 140 determines whether the database is accessible via the platform. Specifically, as described above with reference to FIG. 3, the CPU 140 requests information managed in the data-service layer 153, from the presentation layer 151 to the background service 152. In the case where the background service 152 is not installed or in the case where the background service 152 is stopped (see FIG. 5), for example, the CPU 140 cannot access the data-service layer 153 via the background service 152, and the CPU 140 cannot obtain data. That is, in the case where the background service 152 is not accessible, the CPU 140 determines that the database is not accessible via the platform.

The reason why the CPU 140 determines whether the database is accessible via the platform is that in the case where the database is accessible via the platform, obtaining and updating the result of search of the MFPs 200 and the device list may be performed on the common database in the PC 100. This reduces the load on the PC 100.

When the CPU 140 determines that the database is accessible via the platform (S1: YES), the CPU 140 at S2 determines whether or not there is one or more databases. When a positive decision (YES) is made at S2, the CPU 140 at S3 determines whether or not there are two or more databases. It is noted that processings to be executed after the positive decision (YES) is made at S1, i.e., processings S2-S11 are executed via the platform through not indicated in FIG. 8.

Figure 6:
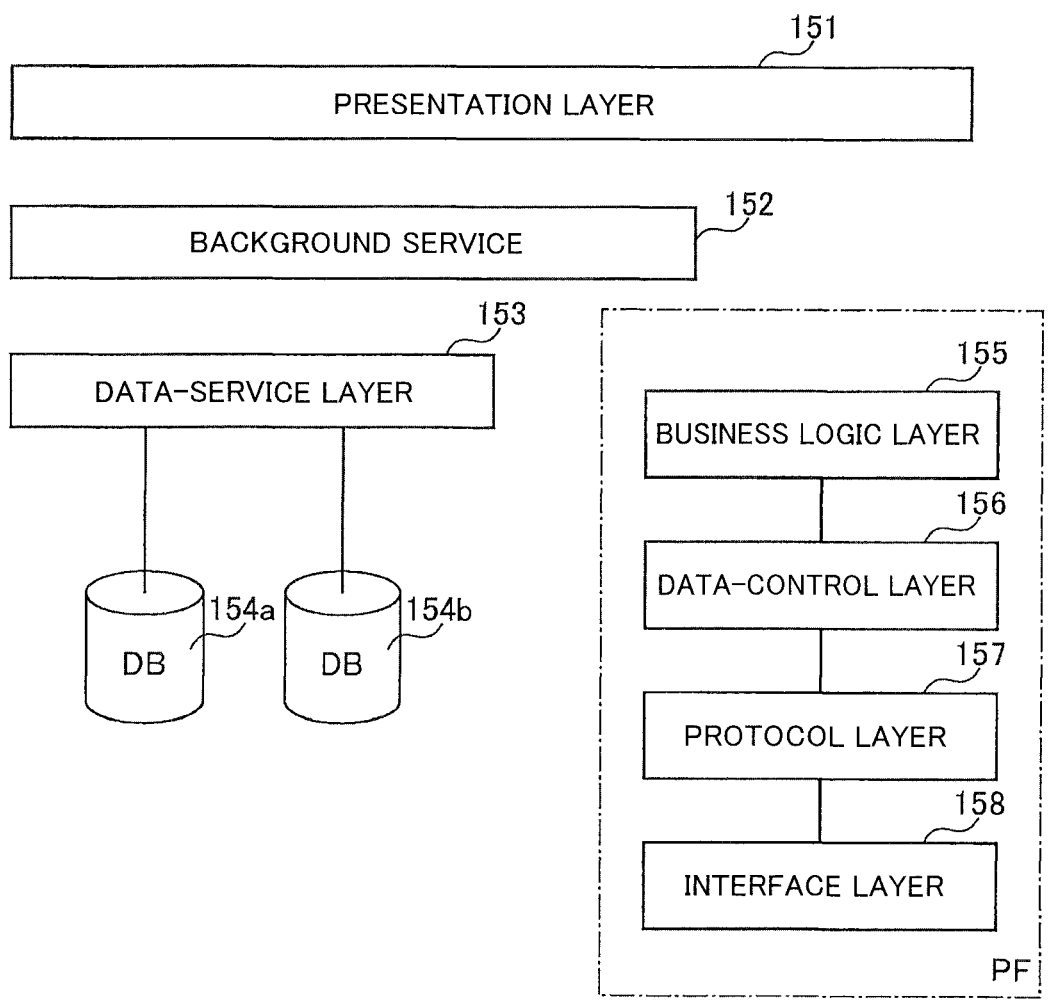
FIG. 6 is a block diagram illustrating one example in the case where the storage of the personal computer in FIG. 1 stores two databases usable by the information processing program in FIG. 2.
Figure 9A:
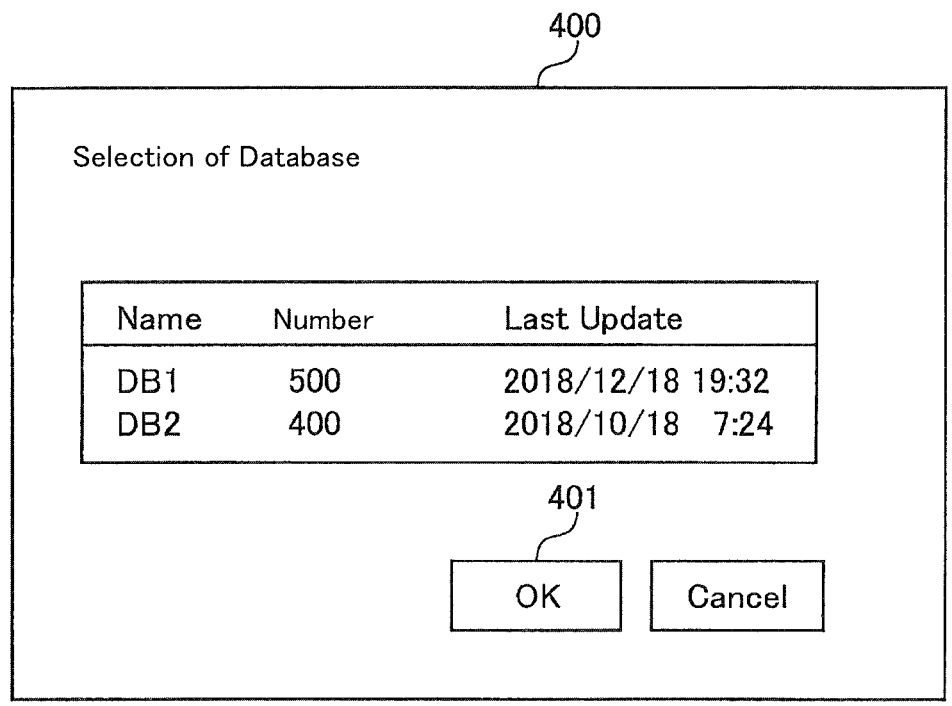
FIG. 9A is a view of one example of a database-selection screen.

In the case where there are two databases, namely, a database 154a and a database 154b, as a result of the determination at S3 as illustrated in FIG. 6, for example, the CPU 140 at S4 controls the display 120 to display a database-selection screen 400 illustrated in FIG. 9A to prompt the user to select one of the databases. The selection is, for example, performed by moving a cursor, not illustrated, over one of the databases (DB1 or DB2 in FIG. 9A) displayed on the database-selection screen 400 and pressing an OK button 401.

The CPU 140 at S5 waits until one of the databases is selected. When one of the databases is selected, this flow goes to S6.

When the CPU 140 at S3 determines that only the database 154 is provided as illustrated in FIG. 2 (S3: NO), this flow goes to S6.

The CPU 140 at S6 determines whether the database stores only one device list. When the CPU 140 at S6 determines that the database stores only one device list (S6: YES), the CPU 140 at S7 reads the device list from the database. The CPU 140 at S8 updates the function executing devices on the device list, i.e., information relating to the MFPs 200 in the present embodiment, and this flow ends.

Figure 9B:
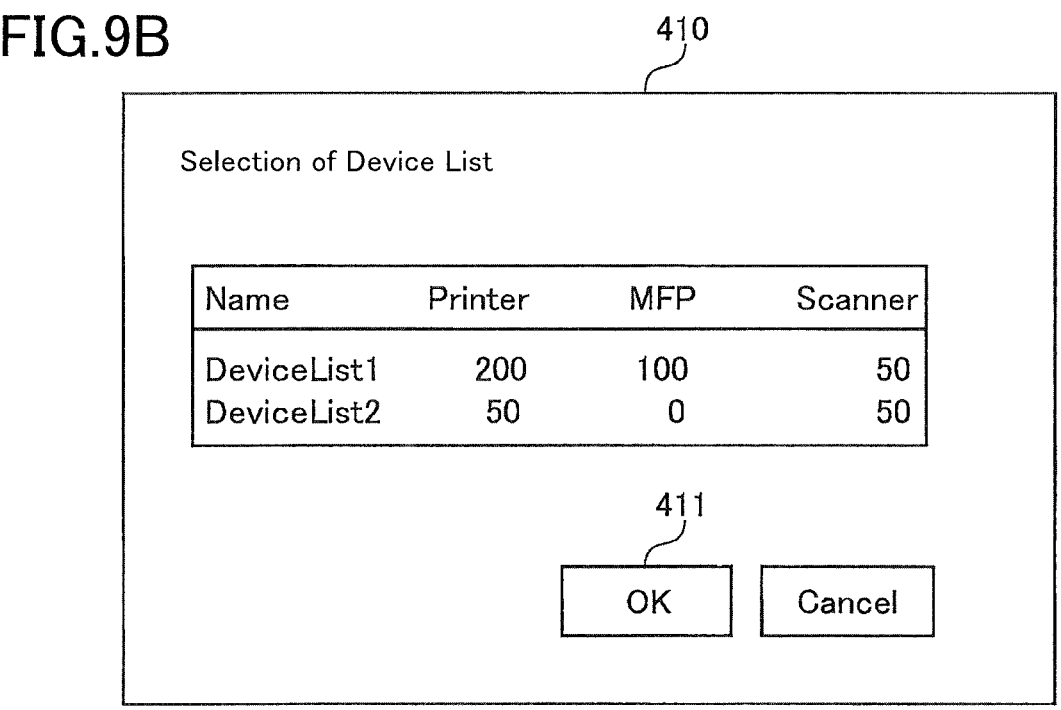
FIG. 9B is a view of one example of a device-list selection screen.

When the CPU 140 at S6 determines that the database stores a plurality of the device lists (S6: NO), the CPU 140 displays the device-list selection screen at S9 to prompt the user to select one of the device lists. FIG. 9B illustrates one example of a device-list selection screen 410 in the case where the database stores two device lists. Like the selection of the database, the selection of the device list on the device-list selection screen 410 is performed by the cursor and an OK button 411.

The CPU 140 at S10 waits until one of the device lists is selected. When one of the device lists is selected, this flow goes to S7.

In the present device-list creating process as described above, in the case where the database stores one or more device lists, the CPU 140 effectively uses the device list to perform only the update of the information relating to the MFPs 200 on the device list without performing a new search of the MFPs 200 and a new creation of the device list.

Figure 7:
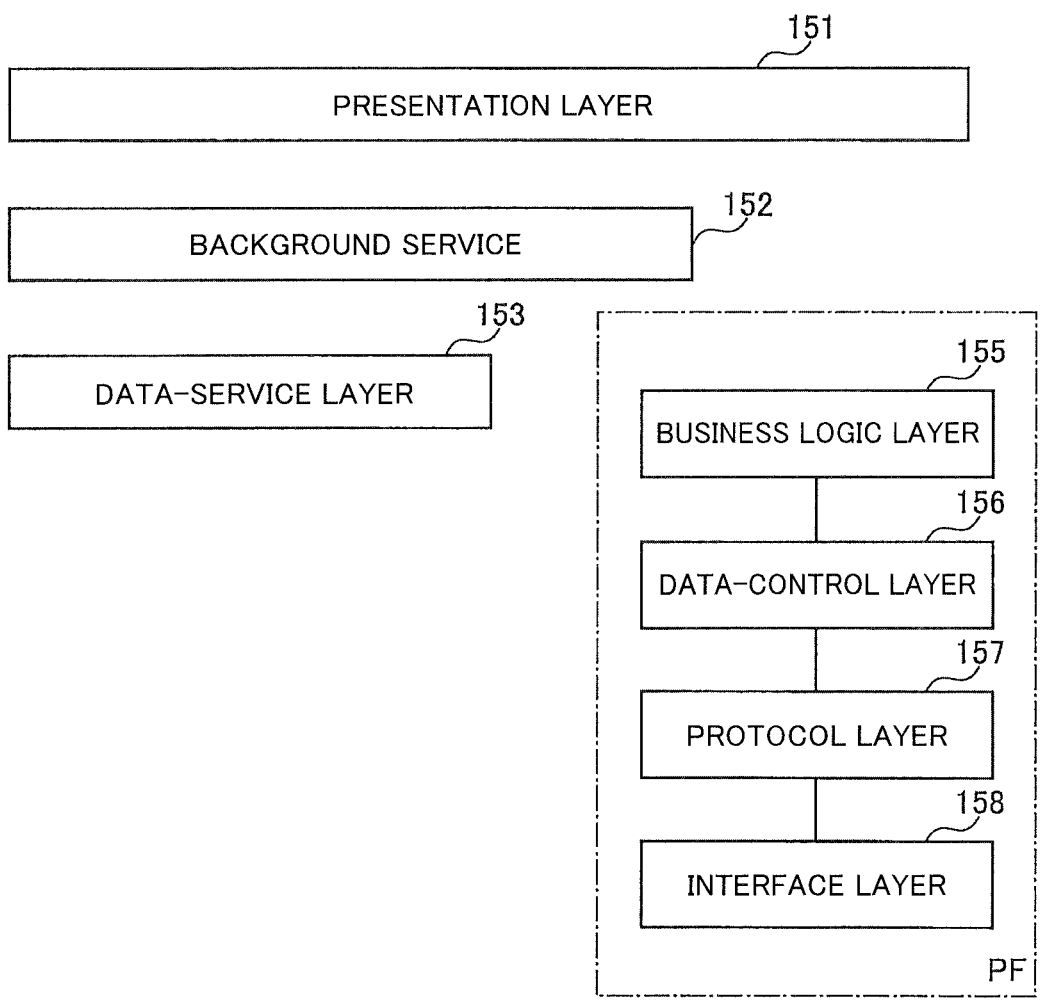
FIG. 7 is a block diagram illustrating one example in the case where the storage of the personal computer in FIG. 1 stores no database usable by the information processing program in FIG. 2.

When the CPU 140 at S2 determines that no database is stored (S2: NO), the CPU 140 at S11 searches for the MFPs 200 via the platform. FIG. 7 illustrates one example of a case where no database is provided though the background service 152 is installed, and the positive decision (YES) is made at S1. The search at S11, specifically, is performed by transmitting a packet to a broadcast address and determining whether the MFP 200 responds to this.

The CPU 140 at S12 creates a device list based on the result of the search and at S13 registers the created device list into the database, and this flow ends.

When the CPU 140 at S1 determines that the database is not accessible via the platform, the CPU 140 at S14 calls the business logic layer 155 to search for the MFPs 200 not via the platform, and this flow goes to S12. The CPU 140 executes the processings at S12 and S13, and this flow ends.

Configuration of HOME Screen

Figure 10:
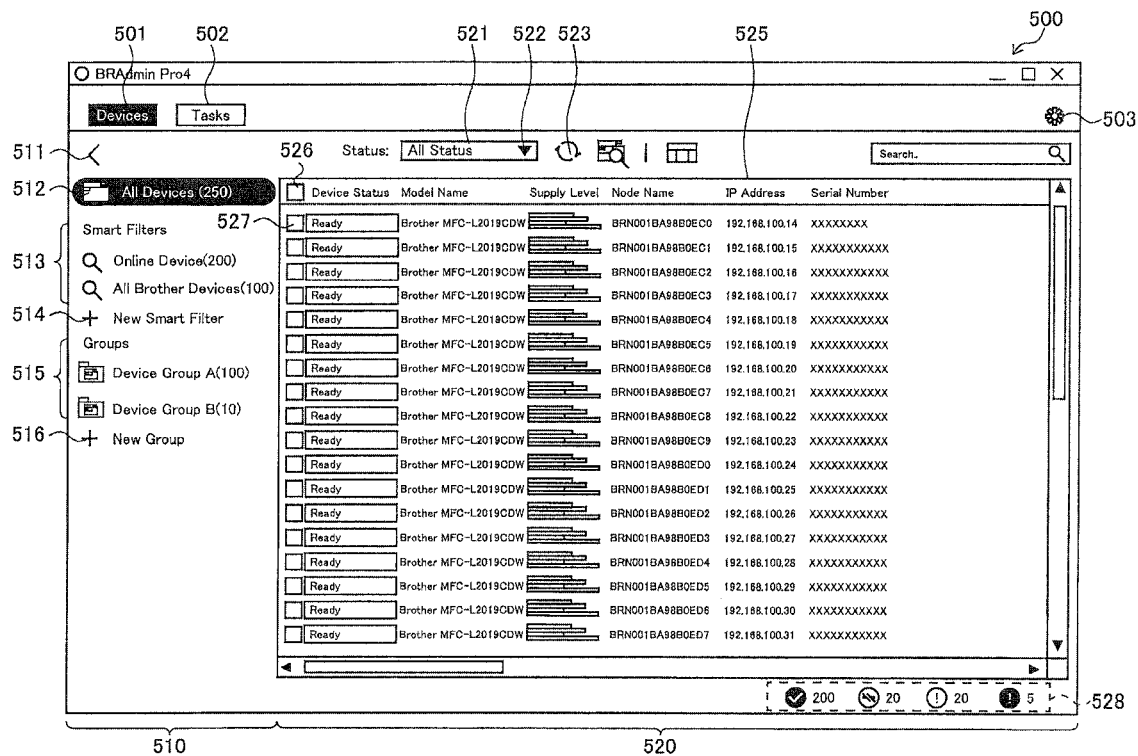
FIG. 10 is a view illustrating one example of a HOME screen that is displayed when the information processing program according to the present embodiment is started in a state in which the database and a device list are determined.

FIG. 10 illustrates one example of a HOME screen 500 displayed when the information processing program according to the present embodiment is started after the database and the device list are determined.

As illustrated in FIG. 10, the HOME screen 500 contains a device button 501, a task button 502, and an application setting button 503. The device button 501 is an operating symbol for displaying the information relating to the MFPs 200 on the device list. The task button 502 is an operating symbol for displaying the current and previous statuses of the tasks. The application setting button 503 is an operating symbol for displaying an application setting screen.

The HOME screen 500 further contains a left pane 510 and a center pane 520.

The center pane 520 contains a device-list region 525 for displaying (i) the names of the selected all or some of the MFPs 200 on the device list ("Model Name" in FIG. 10) and (ii) relevant information ("Device Status", "Supply Level", "Node Name", "IP Address", and "Serial Number" in FIG. 10). Here, "Device Status" indicates an operating status of the MFP 200, and "Supply Level" indicates a consumable remaining amount. Examples of consumables include toner and ink.

Figure 16:
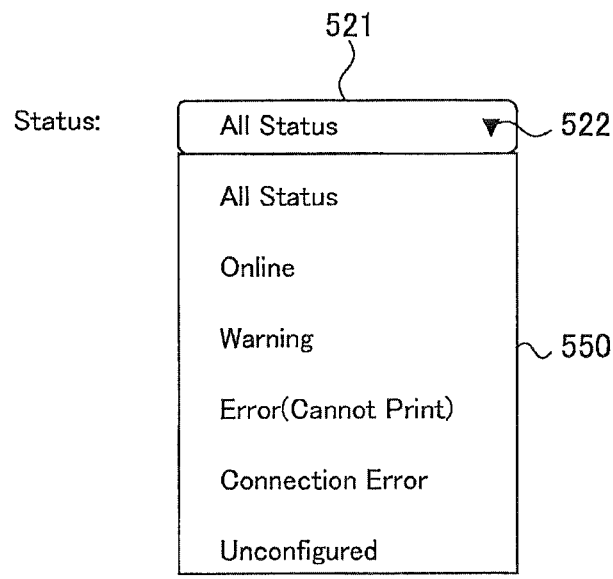
FIG. 16 is a view of one example of a drop-down list displayed when a drop-down button is pressed on the HOME screen in FIG. 10.

An upper portion of the center pane 520 contains a status-selection combo box 521 for switching the MFPs 200 to be displayed on the center pane 520, according to their respective statuses. A drop-down button 522 is provided at a right end of the status-selection combo box 521. When the drop-down button 522 is pressed by the user, as illustrated in FIG. 16, a drop-down list 550 is displayed. When one of a plurality of statuses on the drop-down list 550 is selected by the user, the selected status is input to the status-selection combo box 521. In response, the MFP or MFPs 200 having the status matching the input status are selected and displayed on the device-list region 525 of the center pane 520.

An update button 523 is provided to the right of the status-selection combo box 521. The update button 523 is for updating the status of each of the MFPs 200 displayed on the device-list region 525 to the latest status.

Two types of check boxes 526, 527 are provided at a left end of the device-list region 525. An uppermost check box 526 can collectively change a selected or unselected state for all check boxes 527 provided for the respective MFPs 200. Each of the check boxes 527 can individually change the selected or unselected state for a corresponding one of the MFPs 200.

A lowermost portion of the center pane 520 contains a status-basis device-number display region 528 for displaying the number of the MFPs 200 for each status.

The present information processing program is configured to perform grouping of the MFPs 200 on the device list. The grouping may be divided into two types: "Smart Filter" and "Group".

The left pane 510 is a region for selecting a group after the grouping. The left pane 510 contains an operating symbol 511 for switching the left pane 510 to its closed state. When the operating symbol 511 is pressed, the center pane 520 is displayed over the HOME screen 500 in its lateral direction in the example in FIG. 10.

The left pane 510 contains: an all-device selection region 512 for displaying all the MFPs 200 on the device list on the device-list region 525; a smart-filter selection region 513 for selecting a group belonging to a category corresponding to "Smart Filter"; and a group selection region 515 for selecting a group belonging to a category corresponding to "Group".

The left pane 510 further contains: a "+" operating symbol 514 for creating a new smart filter; and a "+" operating symbol 516 for creating a new group.

In the case where the user operates the HOME screen 500 in FIG. 10 to change the MFPs 200 displayed on the device-list region 525 from all the MFPs 200 to ten MFPs 200 belonging to a group B, the user presses an icon "Device Group B(10)" displayed on the group selection region 515 of the left pane 510.

Figure 11:
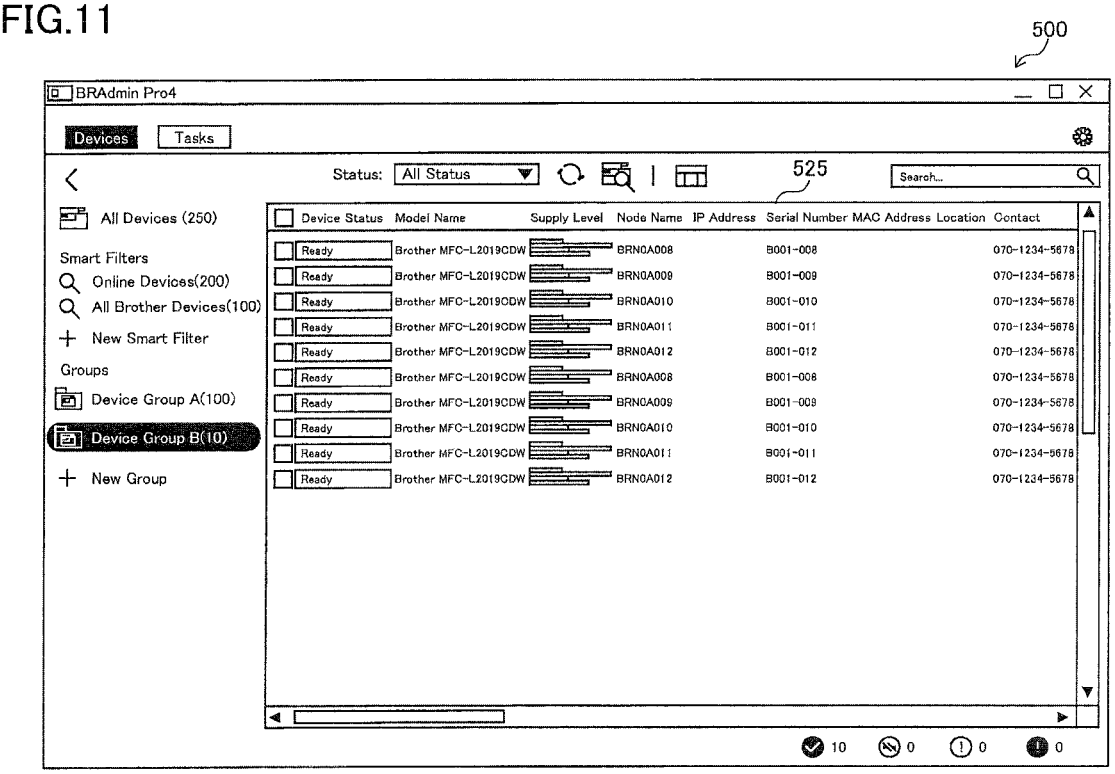
FIG. 11 is a view illustrating one example of the HOME screen in the case where ten MFPs belong to a group B among the MFPs on the device list are displayed on a device-list region.

FIG. 11 illustrates the HOME screen 500 in the case where ten MFPs 200 belonging to the group B among the MFPs 200 on the device list are displayed on the device-list region 525.

Figure 12:
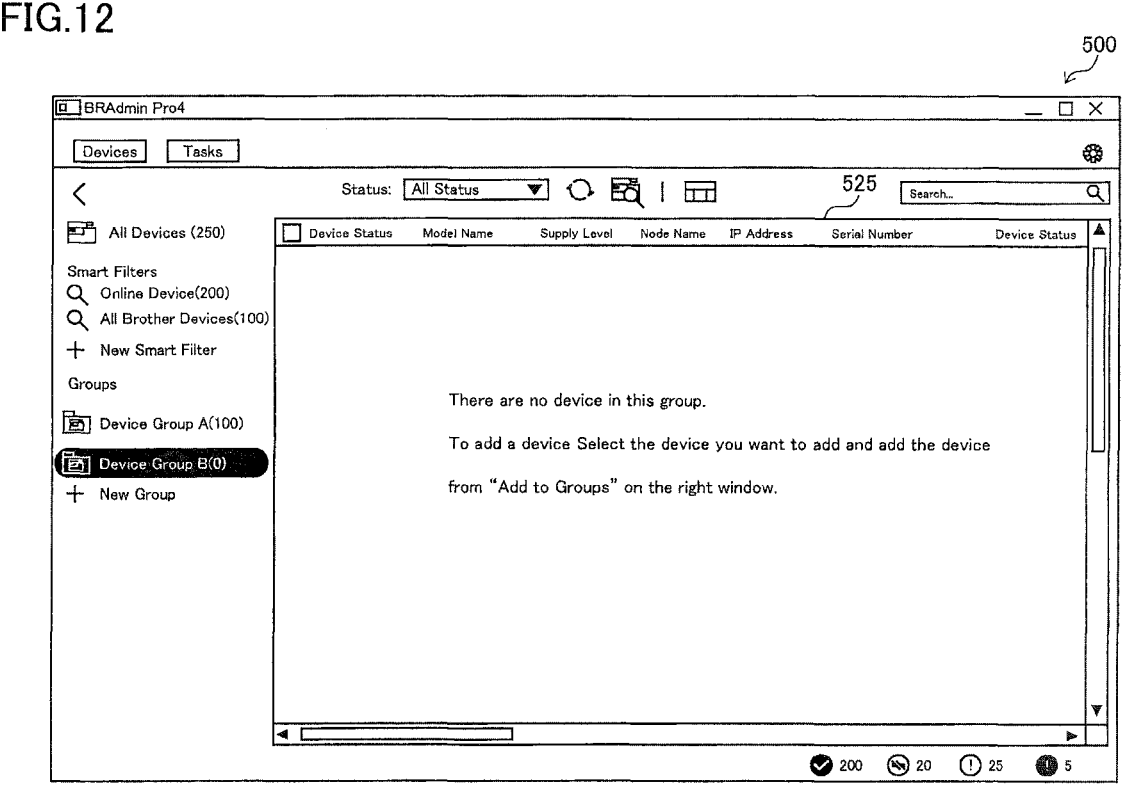
FIG. 12 is a view illustrating one example of the HOME screen in the case where the group B is selected in a state in which no MFPs belong to the group B.

FIG. 12 illustrates one example of the HOME screen 500 in the case where the group B is selected in a state in which no MFPs 200 belong to the group B. Since there are no MFPs 200 to be displayed on the device-list region 525 in FIG. 12, a message "There are no device in this group." is displayed on the device-list region 525 in FIG. 12, for example. A message "To add a device, select the device you want to add and add the device from "Add to Groups" on the right window." is also displayed on the device-list region 525. The right window is a right pane 530 in FIG. 13, and "Add to Groups" is a menu displayed on an action selection region 532 of the right pane 530. The menu "Add to Groups" is selected by clicking a tab 532b on the action selection region 532.

Figure 13:
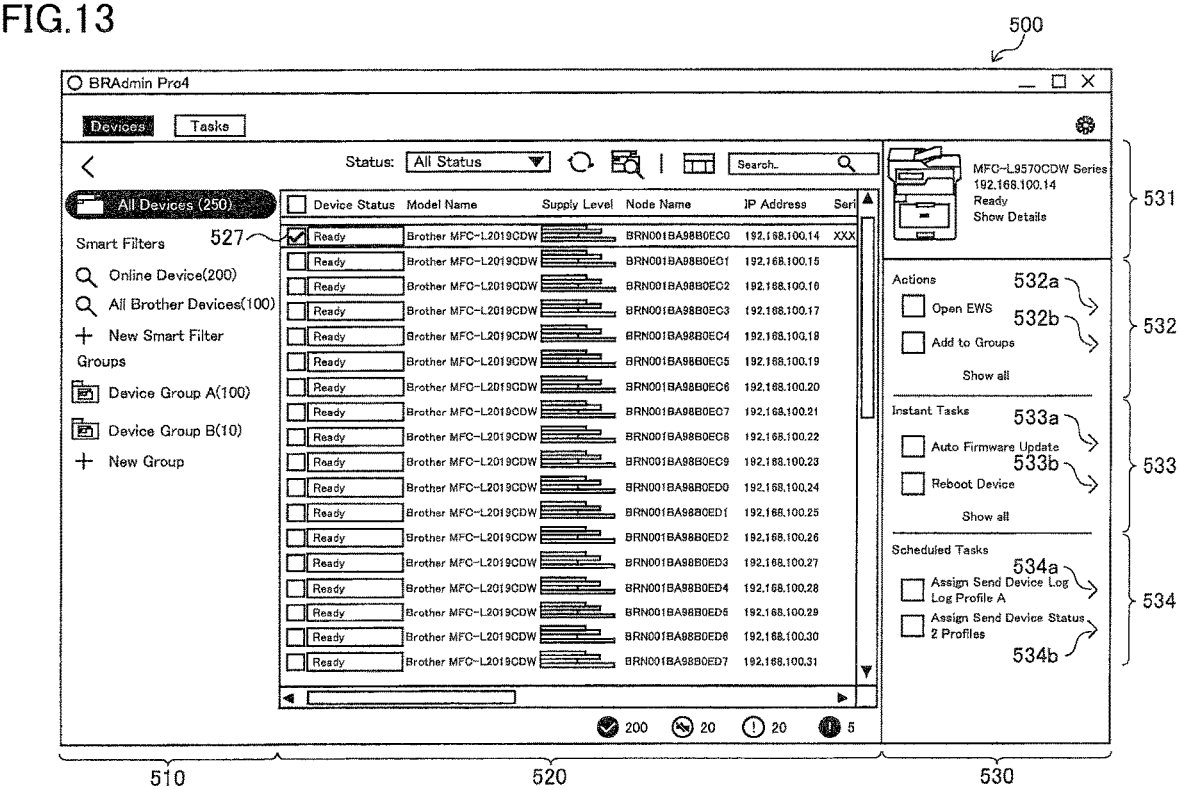
FIG. 13 is a view illustrating one example of the HOME screen in the case where the uppermost one of the MFPs displayed on the device-list region is selected on the HOME screen in FIG. 10.

When the user operates the HOME screen 500 in FIG. 10 to select an uppermost one of the MFPs 200 displayed on the device-list region 525, as illustrated in FIG. 13, the check box 527 corresponding to the MFP 200 is checked. In response, the right pane 530 is displayed on the HOME screen 500.

The right pane 530 is a region for instructing an action and a task for the selected MFP 200. The action is an operation for instantly executing a processing for the selected MFP 200. The task is an operation for executing the processing for the selected MFP 200 in accordance with a lapse of time including an instant. An instant task is an operation to be performed instantly among the tasks. A scheduled task is an operation to be performed according to a set schedule among the tasks.

The right pane 530 contains: a region 531 indicating a status of the selected MFP 200; the action selection region 532 for selection of a type of the action to be instructed; an instant-task selection region 533 for selection of a type of the instant task to be instructed; and a scheduled-task selection region 534 for selection of a type of the scheduled task to be instructed.

When only one of the MFPs 200 displayed on the device-list region 525 is selected, as illustrated in FIG. 13, an icon representing the selected MFP 200 and information relating to the selected MFP 200 are displayed on the region 531 of the right pane 530. In the illustrated example, the information displayed on the region 531 represents the name of the MFP 200 "MFC-L9570CDW Series", the IP address "192.168.100.14", and the status "Ready".

When "Show Details" displayed on the region 531 is pressed by the user, detail information relating to the selected MFP 200 is displayed on a pop-up window, for example. FIG. 15 illustrates one example of detail information.

Figure 14:
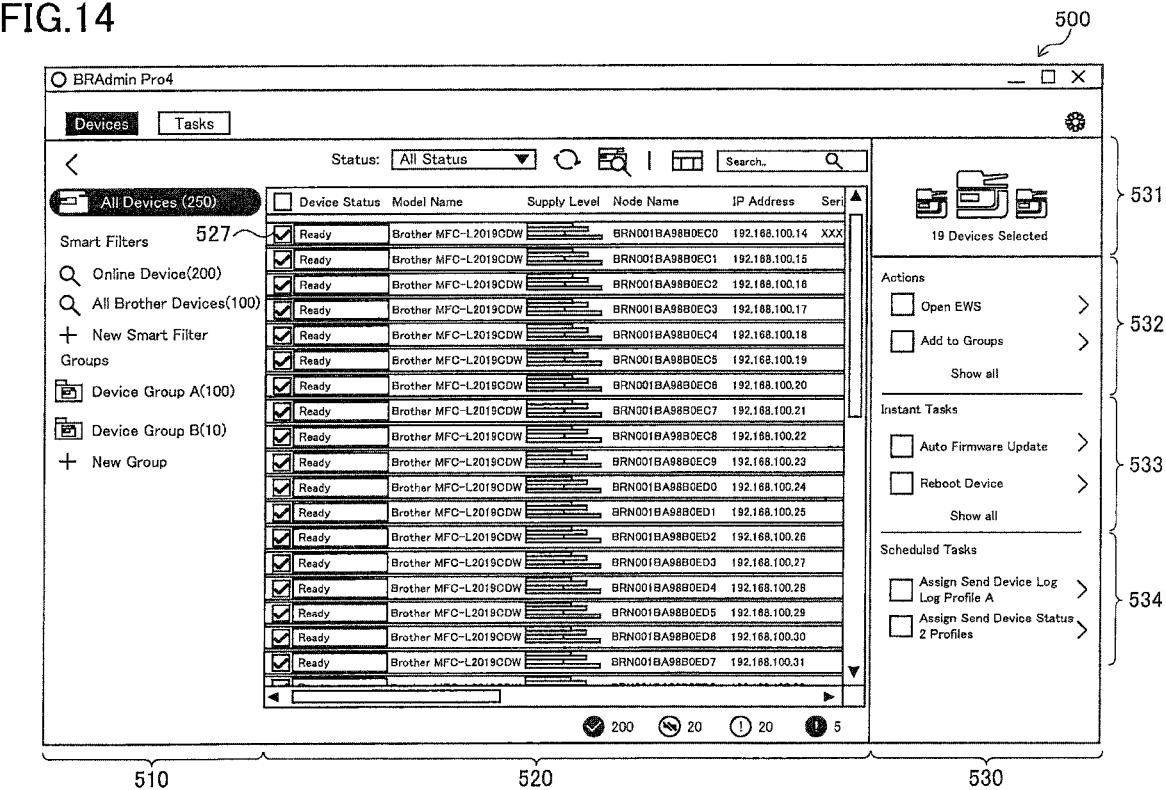
FIG. 14 is a view illustrating one example of the HOME screen in the case where ones of the MFPs displayed on the device-list region are selected on the HOME screen in FIG. 10.

When the user operates the HOME screen 500 in FIG. 10 to select ones of the MFPs 200 displayed on the device-list region 525, as illustrated in FIG. 14, the check boxes 527 corresponding to the respective selected MFPs 200 are checked. In response, the right pane 530 is displayed on the HOME screen 500.

Different from the region 531 of the right pane 530 in FIG. 13, only the icons and a message indicating that the nineteen MFPs 200 are selected are displayed on the region 531 of the right pane 530 in FIG. 14. This is because the size of the region 531 is too small to display information relating to a plurality of the MFPs 200.

Creation of New Group

Figure 17:
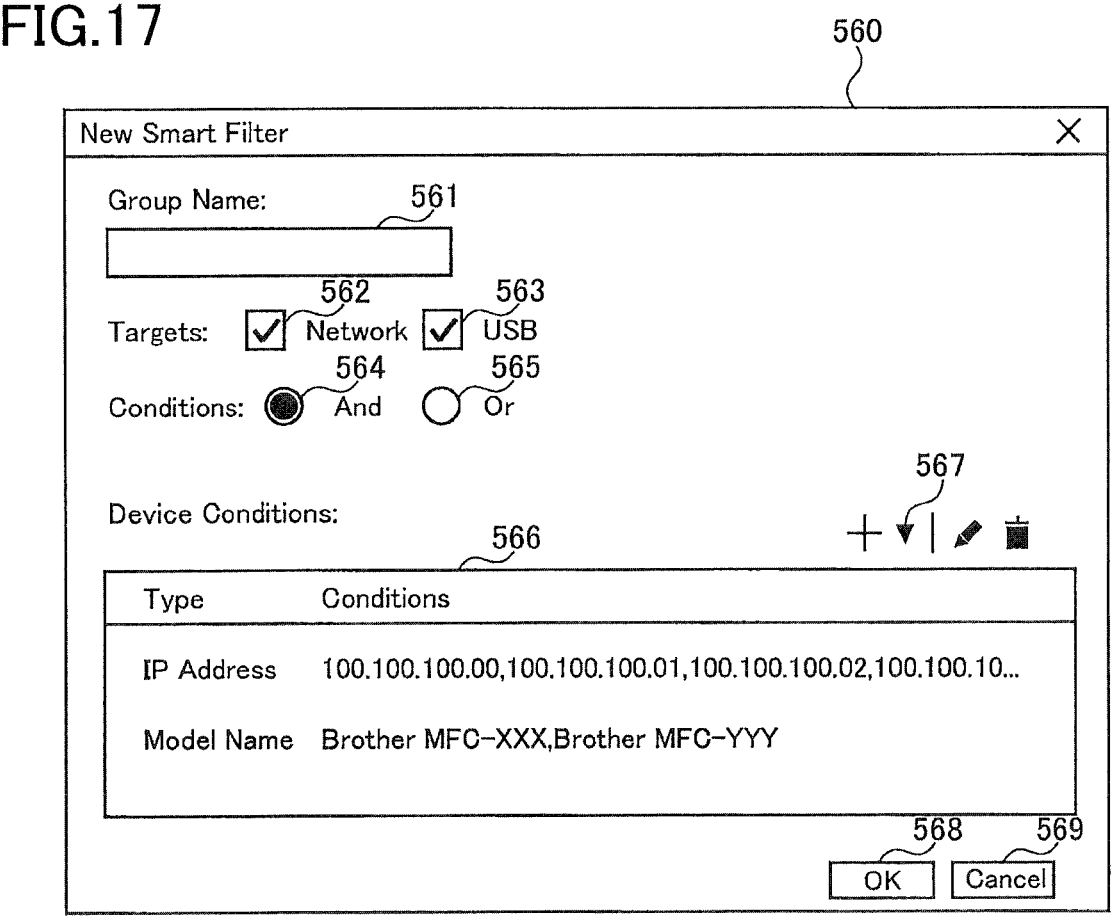
FIG. 17 is a view of one example of a new-smart-filter creating window.

When the user operates the HOME screen 500 in FIG. 10 to press the "+" operating symbol 514 on the left pane 510, a new-smart-filter creating window is popped up. FIG. 17 illustrates one example of a new-smart-filter creating window 560.

The new-smart-filter creating window 560 contains: a text box 561 for input of a group name; check boxes 562, 563 for selecting a manner of connection of the MFP 200, that is, for selecting which is to be used for connection, a network or a USB; and radio buttons 564, 565 for selecting which is to be used for combination of conditions, "And" or "Or".

The new-smart-filter creating window 560 further contains a region 566 for setting conditions belonging to this group. Each of the conditions may be set for each type.

Figure 18:
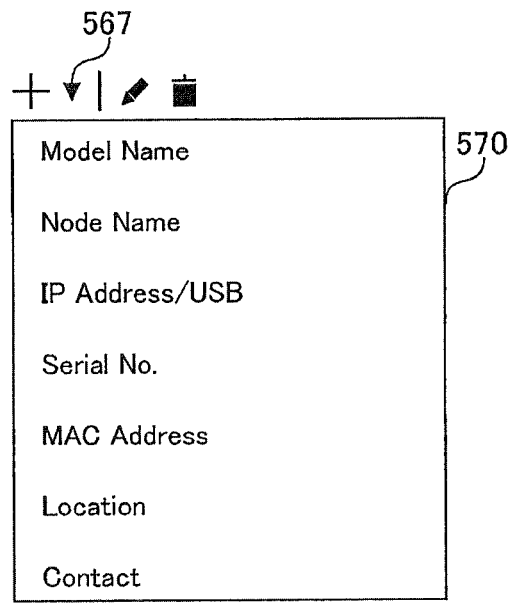
FIG. 18 is a view of one example of the drop-down list when a drop-down button is pressed on the new-smart-filter creating window in FIG. 17.
Figure 19:
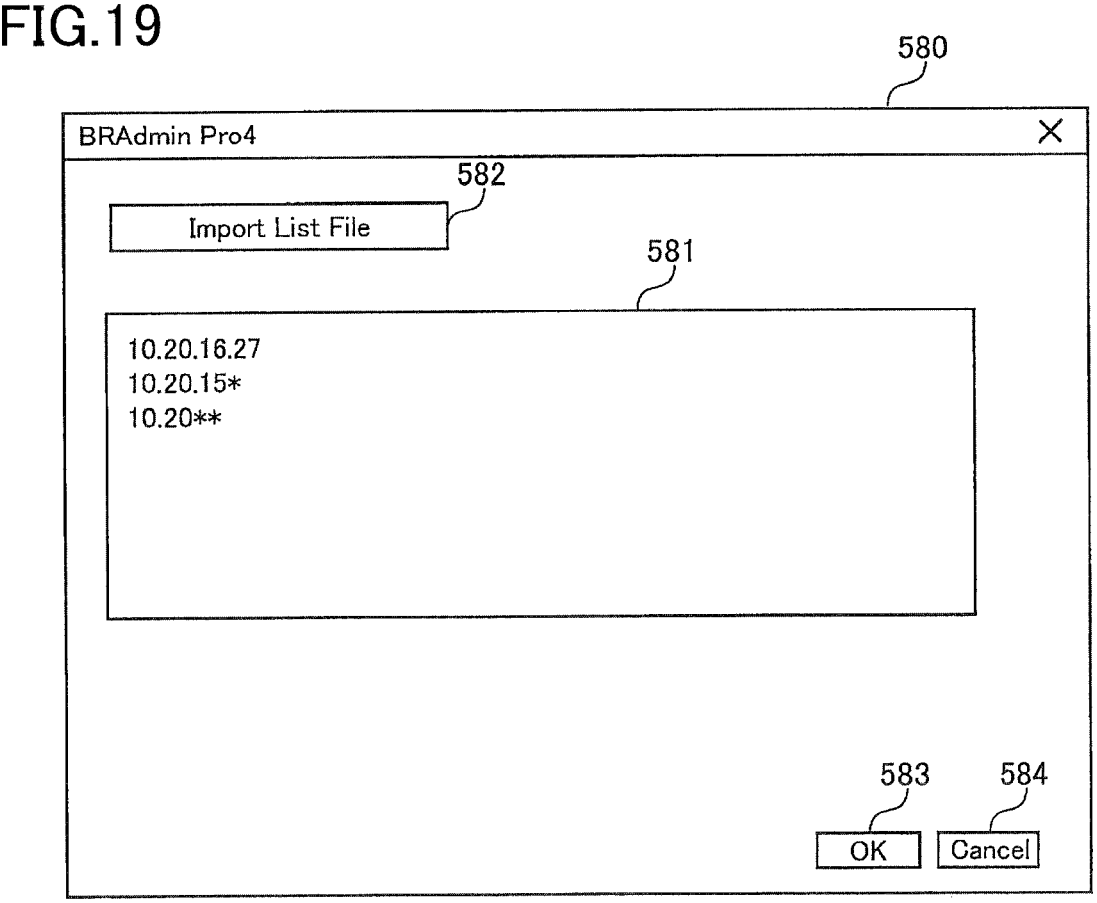
FIG. 19 is a view of one example of an IP-address input window.

The type is set by selecting it from a drop-down list that is displayed by pressing a drop-down button 567. FIG. 18 illustrates one example of a drop-down list 570. When "IP Address" on the drop-down list 570 is pressed, for example, an IP-address input window is popped up. FIG. 19 illustrates one example of an IP-address input window 580.

The IP-address input window 580 contains: a text box 581 for input of an IP address; and a button 582 for import of a list file. When the button 582 is pressed, application software (hereinafter referred to as "application") for browsing and searching for a file is started. The user uses this application to designate a list file to be imported. When the list file is imported, the contents of the list file are input to the text box 581.

The user may input an IP address into the text box 581 using the keyboard. As in the example in FIG. 19, the user may use the wildcard "*".

When the input of the IP address is finished, and the input IP address is set to the region 566 of the new-smart-filter creating window 560, the user presses an OK button 583 provided on the IP-address input window 580. In response, as illustrated in FIG. 17, the IP address input to the text box 581 of the IP-address input window 580 is set to the region 566 of the new-smart-filter creating window 560.

When canceling the input IP address, the user presses a Cancel button 584. In response, the IP address input to the text box 581 is deleted.

When one of the types is selected, the selected type is grayed out on the drop-down list 570 so as not to be selected again.

When the user finishes the input on the new-smart-filter creating window 560 and wants to register the input IP address as a new smart filter, the user presses an OK button 568. When the user does not want to register the input IP address as a new smart filter, the user presses a Cancel button 569.

Figure 20A:
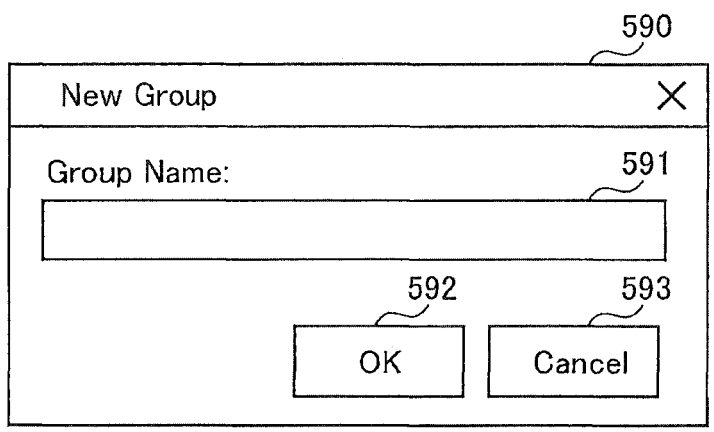
FIGS. 20A and 20B are views each illustrating one example of a new-group creating window.

When the user operates the HOME screen 500 in FIG. 10 to press the "+" operating symbol 516 on the left pane 510, a new-group creating window is popped up. FIG. 20A illustrates one example of a new-group creating window 590. The new-group creating window 590 contains a text box 591 for input of a group name, an OK button 592, and a Cancel button 593.

The new-group creating window 590 is popped up in the case where the "+" operating symbol 516 is pressed in a state in which any of the MFPs 200 displayed on the device-list region 525 is not selected as illustrated in FIG. 10. Thus, a new group in which only the group name is set is created on the new-group creating window 590, and no MFPs 200 belong to the new group.

Figure 20B:
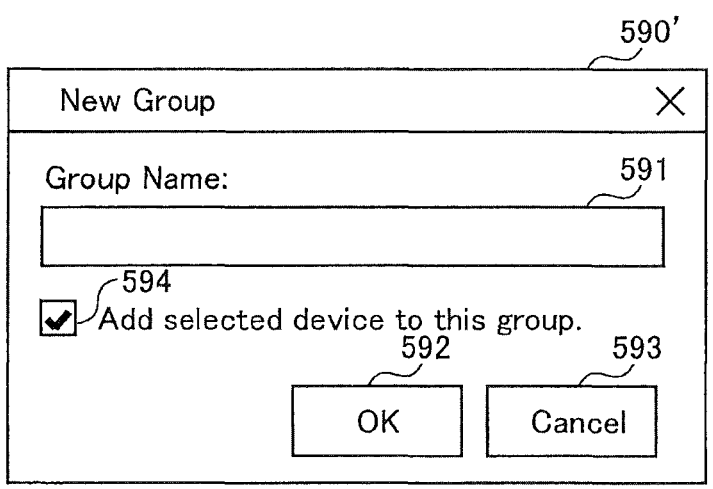

In contrast, in the case where the "+" operating symbol 516 is pressed as illustrated FIG. 13 or 14 in a state in which at least one of the MFPs 200 displayed on the device-list region 525 is selected, a new-group creating window 590' illustrated in FIG. 20B is popped up.

The new-group creating window 590' in FIG. 20B is different from the new-group creating window 590 in FIG. 20A in that a check box 594 is additionally displayed. The check box 594 is checked in the default setting. Thus, when the user operates the new-group creating window 590' to input a new group name to the text box 591 and presses the OK button 592, a new group belonging to the selected MFP 200 is created.

Task Creating Processing

Figure 21:
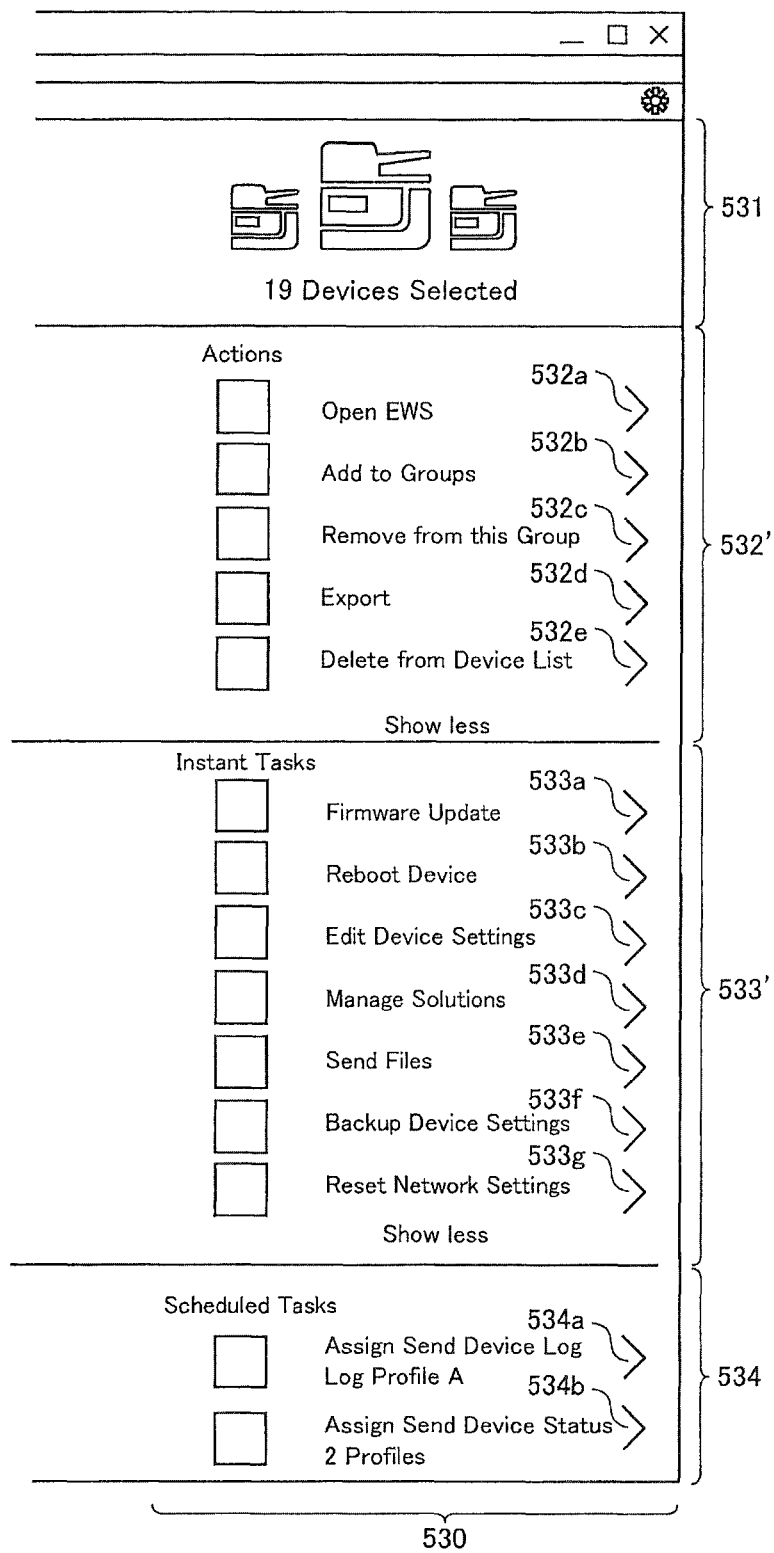
FIG. 21 is a view of one example of a right pane when two "Show all" buttons are pressed on the HOME screen in FIG. 14.

When the user presses "Show all" for any of the action selection region 532 and the instant-task selection region 533 of the right pane 530 on the HOME screen 500 in FIG. 14, the types of all the selectable actions and instant tasks are displayed. FIG. 21 illustrates one example of the right pane 530 in this case.

The types of actions selectable on an action selection region 532' are five types in the illustrated example, and the five types are respectively provided with tabs 532a-532e each for making a transition to a setting screen. The types of instant tasks selectable on an instant-task selection region 533' are seven types in the illustrated example, and the seven types are respectively provided with tabs 533a-533g each for making a transition to a setting screen. The types of the scheduled tasks selectable on the scheduled-task selection region 534 are two types in the illustrated example, and the two types are respectively provided with tabs 534a, 534b each for making a transition to a setting screen.

It is noted that the display order of actions in the category of the action, i.e., the actions of the five types in the illustrated example, changes depending upon the frequency of use, the number of use, the last use date, or the like. That is, the actions are arranged such that the action with a higher frequency of use, the larger number of use, a newer last use date is positioned at a higher level. Likewise, the display order of the instant tasks and the display order of the scheduled tasks change in the similar manner.

In the case where a plurality of the MFPs 200 are selected as in the right pane 530 in FIG. 21, some types of the actions and the tasks are in some case not supported by the MFP 200 and cannot set for the MFP 200. In this case, the actions and the tasks that cannot be set are grayed out and cannot be selected.

Figure 22:
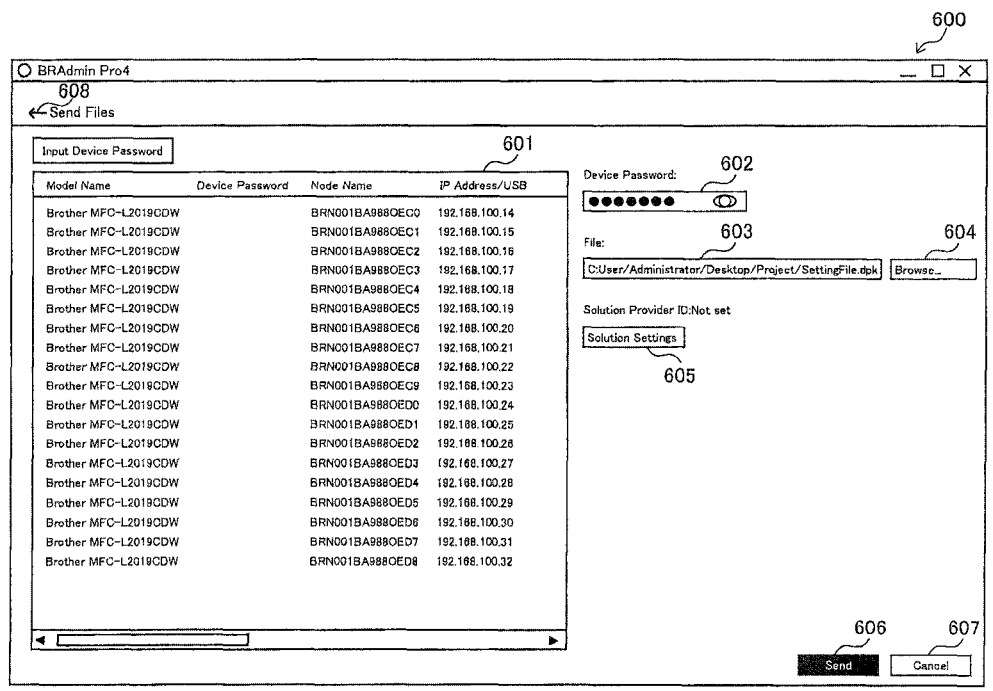
FIG. 22 is a view of one example of a task setting screen for "Send Files"

When the user presses the tab 533e displayed on the instant-task selection region 533' on the right pane 530 in FIG. 21, for example, the HOME screen 500 in FIG. 14 is switched to a task setting screen for "Send Files" that is one of the instant tasks. FIG. 22 illustrates one example of a task setting screen 600 for "Send Files".

The task setting screen 600 in FIG. 22 contains: a transmission-destination-list region 601 for displaying a list of destinations of transmission of files; a password input box 602; a file-designation box 603 for designation of a file to be transmitted; a button 604 for calling the above-described application for browsing and searching for a file; and a solution-provider-ID input box 605. The task setting screen 600 further contains: a Send button 606 for instructing transmission of the file; and a Cancel button 607 for canceling a setting.

The MFP 200 selected on the HOME screen 500 displayed just before transition to the task setting screen 600 is automatically input to the transmission-destination-list region 601. Thus, the user can input a password to the password input box 602, input a location of a file to be transmitted, to the file-designation box 603, input a solution-provider ID to the solution-provider-ID input box 605, and press the Send button 606 to transmit the designated file to the selected MFP 200 via a solution provider indicated by the input ID.

It is noted that an arrow indication 608 on the task setting screen 600 is an operating symbol for instructing a return to the previous screen. Thus, the user can switch the screen back to the previous screen, i.e., the HOME screen 500 in FIG. 14, by pressing this arrow indication 608.

Figure 23:
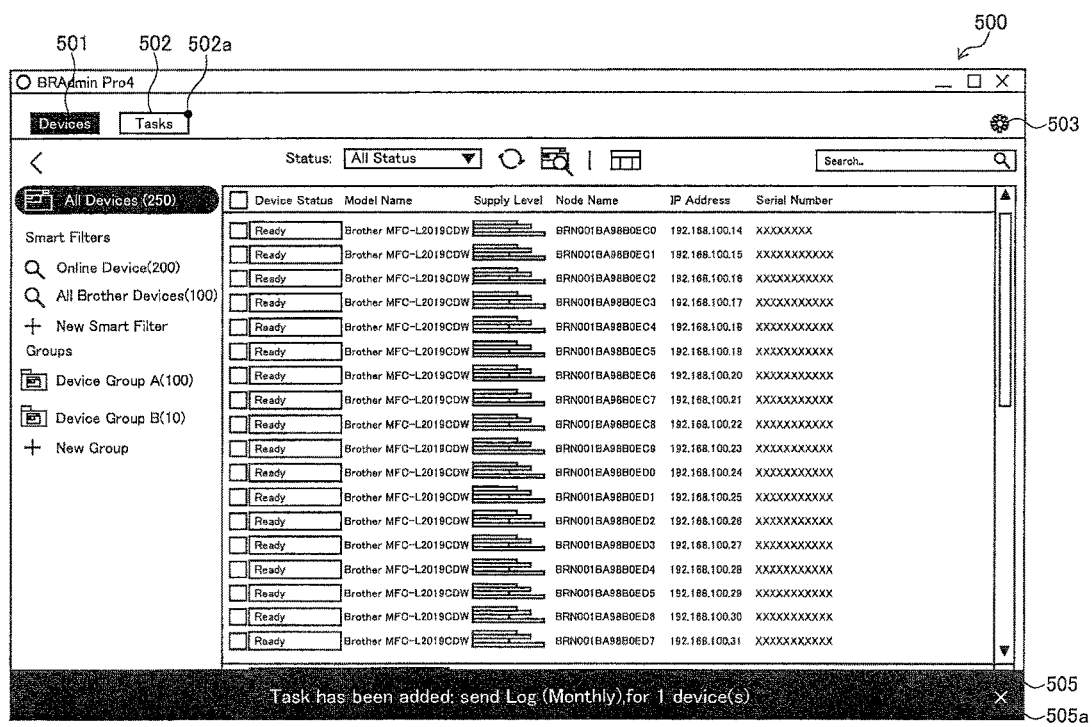
FIG. 23 is a view illustrating one example of the HOME screen displayed after a task is set on the task setting screen.

Pressing the Send button 606 switches the task setting screen 600 to the HOME screen 500. FIG. 23 illustrates one example of the HOME screen 500 switched from the task setting screen 600.

The HOME screen 500 in FIG. 23 is different from the HOME screen 500 in FIG. 14 displayed before transition to the task setting screen 600, in that a notification badge 502*a* is displayed at a corner of the task button 502, and a footer notification 505 is displayed.

In the present embodiment, the notification badge 502*a* has a round shape and notifies the user that the task has been set. The notification badge 502*a* is displayed in blue in a state in which the task is set. The notification badge 502*a* is displayed in red while the task is being performed. When the HOME screen 500 is switched to the task setting screen 600, the notification badge 502*a* disappears from the screen.

Like the notification badge 502*a*, when the task is set, the footer notification 505 is displayed to notify the user that the task has been set. Unlike the notification badge 502*a*, however, the footer notification 505 disappears after a predetermined lapse of time or when a "x" button 505*a* is pressed.

It is noted that the notification badge 502*a* and the footer notification 505 are displayed when not only the task for "Send Files" but also any task is set.

Figure 24:
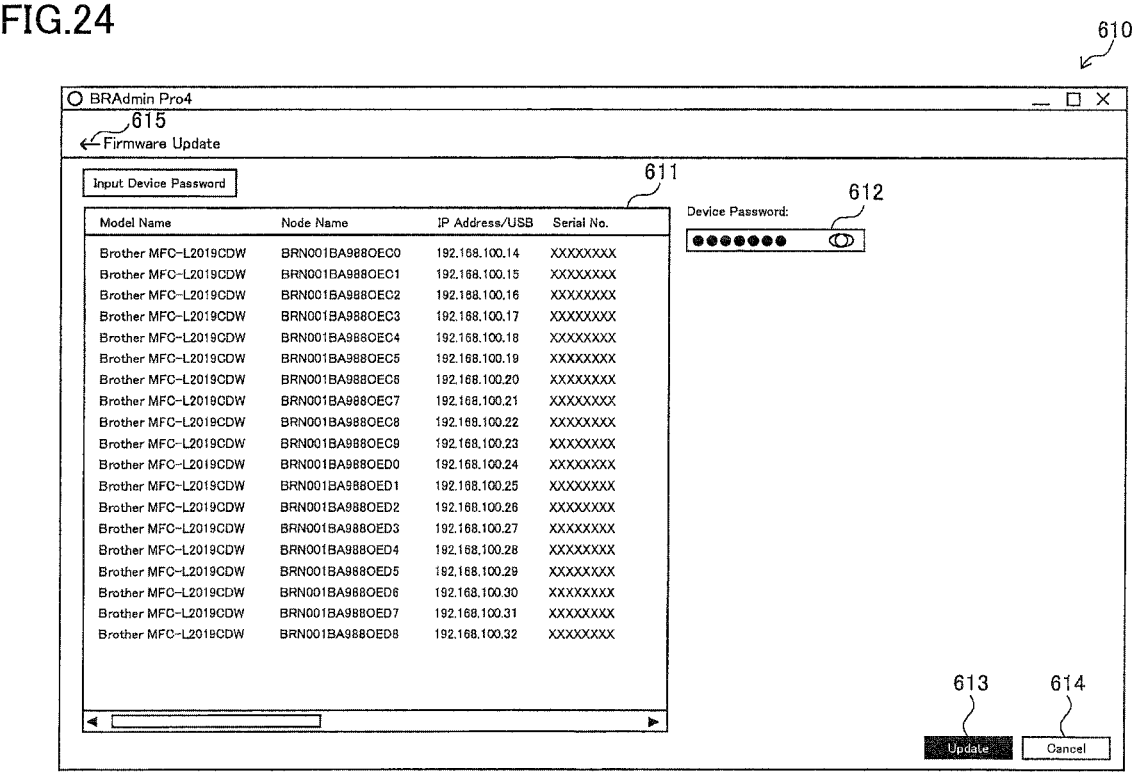
FIG. 24 is a view of one example of a task setting screen for "Firmware Update"

When the user presses the tab 533*a* displayed on the instant-task selection region 533' on the right pane 530 in FIG. 21, the HOME screen 500 in FIG. 14 is switched to a task setting screen for "Firmware Update" as one of the instant tasks. FIG. 24 illustrates one example of a task setting screen 610 indicating "Firmware Update".

The task setting screen 610 in FIG. 24 contains: an update-object list region 611 for displaying a list of the MFPs 200 to be updated; a password input box 612; an Update button 613 for instructing an update; and a Cancel button 614 for canceling a setting.

The MFP 200 selected on the HOME screen 500 displayed just before transition to the task setting screen 610 is automatically input to the update-object list region 611. Thus, the user can input a password to the password input box 612 and press the Update button 613 to update firmware of the MFP 200 to be updated.

Like the arrow indication 608 on the task setting screen 600 (see FIG. 22), an arrow indication 615 on the task setting screen 610 is an operating symbol for instructing a return to the previous screen. Thus, the user can switch the screen back to the previous screen, i.e., the HOME screen 500 in FIG. 14, by pressing this arrow indication 615.

Figure 25:
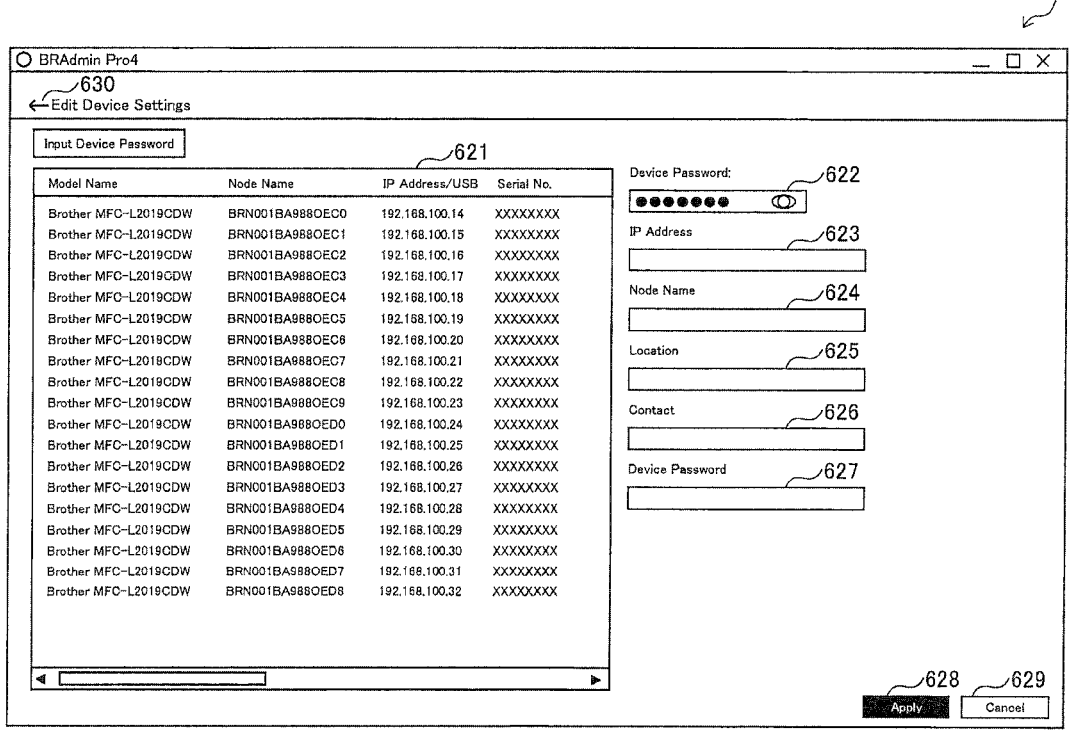
FIG. 25 is a view of one example of a task setting screen for "Edit Device Settings"

When the user presses the tab 533*c* displayed on the instant-task selection region 533' on the right pane 530 in FIG. 21, the HOME screen 500 in FIG. 14 is switched to a task setting screen for "Edit Device Settings" as one of the instant tasks. FIG. 25 illustrates one example of a task setting screen 620 for "Edit Device Settings".

The task setting screen 620 in FIG. 25 contains: an edit-object-list region 621 for displaying a list of the MFPs 200 for "Edit Device Settings"; a password input box 622; a new-IP-address input box 623; a new-node-name input box 624; a new-location input box 625; a new-contact input box 626; and a new-password input box 627.

The task setting screen 620 contains: an Apply button 628 for instructing application of a result of the edit to each of the MFPs 200; and a Cancel button 629 for canceling the result of the edit.

The MFP 200 selected on the HOME screen 500 displayed just before transition to the task setting screen 620 is also automatically input to the edit-object-list region 621. Thus, the user can input a password to the password input box 612, input a value to a desired one of the input boxes 623-627, and press the Apply button 628 to change a device setting of the MFP 200 to be edited. In the case where there are a plurality of the MFPs 200 to be edited, it is impossible to edit the IP address and the node name. In this case, specifically, the new-IP-address input box 623 and the new-node-name input box 624 are grayed out so as to inhibit reception of an input. This is because the same IP address and the same node name must not exist on the same network. That is, this is because, when the Apply button 628 is pressed in a state in which a new IP address and a new node name are input respectively to the new-IP-address input box 623 and the new-node-name input box 624, the input new IP address and the input new node name are applied to all the MFPs 200 to be edited.

Like the arrow indication 608 on the task setting screen 600 (see FIG. 22), an arrow indication 630 on the task setting screen 620 is also an operating symbol for instructing a return to the previous screen. Thus, the user can switch the screen back to the previous screen, i.e., the HOME screen 500 in FIG. 14, by pressing this arrow indication 615.

Figure 26:
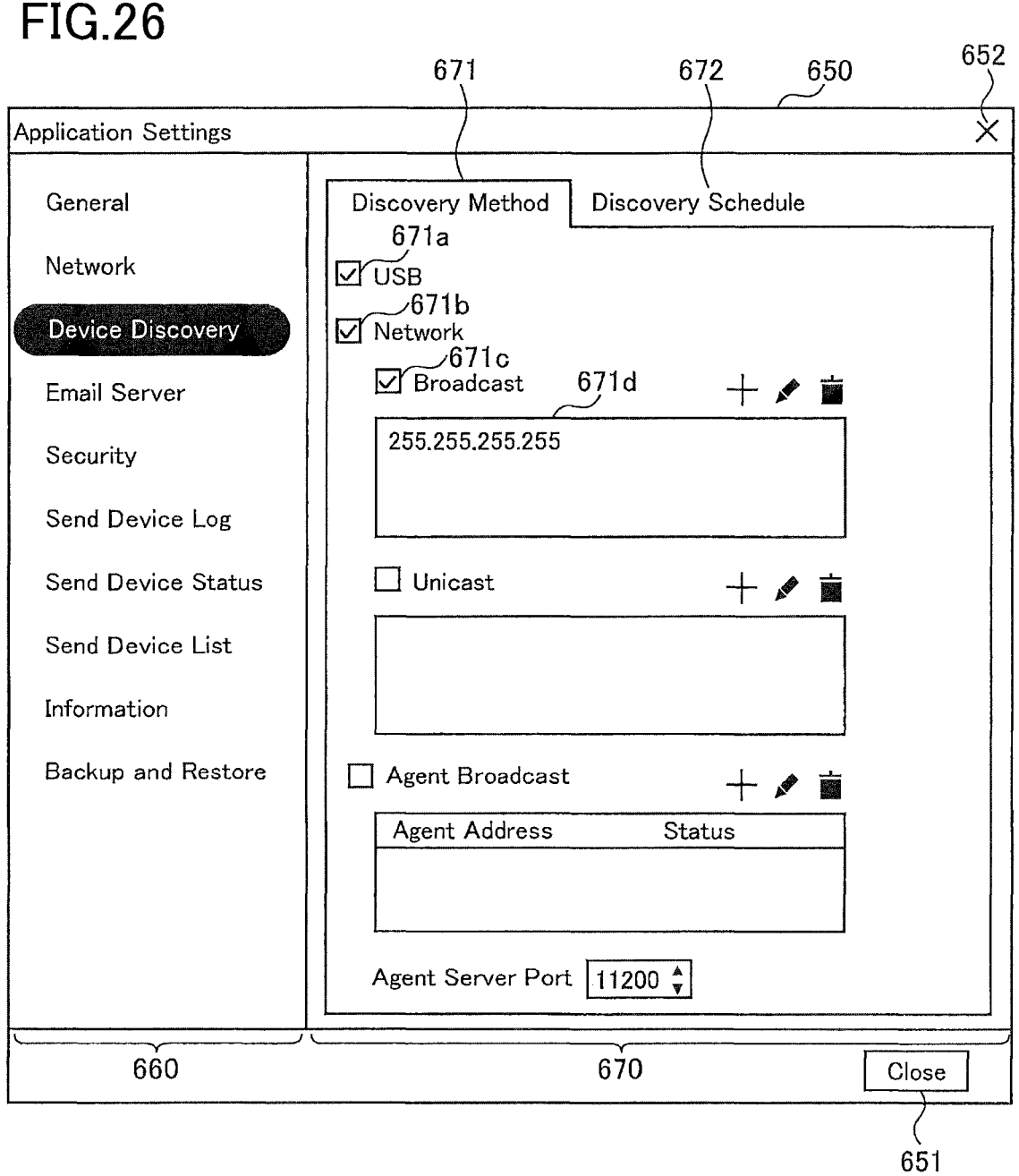
FIG. 26 is a view of one example of an application setting screen.

When the user presses the application setting button 503 on the HOME screen 500 in FIG. 10, a window of an application setting screen is popped up. FIG. 26 illustrates one example of an application setting screen 650.

The application setting screen 650 includes a left pane 660 and a right pane 670. The left pane 660 is a region for displaying a setting item list. The right pane 670 is a region for detailed setting of each item on the setting item list.

In the example in FIG. 26, an item "Device Discovery" is selected from the setting item list on the left pane 660, and a type of a parameter settable for the item "Device Discovery" and input fields for the value are displayed on the right pane 670. It is noted that "Device Discovery" means search of a device communicably connected to the PC 100, i.e., the MFP 200 in the present embodiment.

The contents displayed on the right pane 670, i.e., the setting contents, are switchable by tabs 671, 672. The tab 671 selected in the illustrated example is named "Discovery Method". "Discovery Method" is a method of search. Specifically, a USB and a network are selected respectively on check boxes 671*a*, 671*b* as communication standard between the PC 100 and the MFP 200, and broadcast communication is selected on a check box 671*c* for the network. As an IP address used for the broadcast communication, "255.255.255.255" is input on a text box 671*d*.

It is noted that the application setting screen 650 disappears when a Close button 651 or a "x" button 652 is pressed.

Configuration of Task Screen

Figure 27:
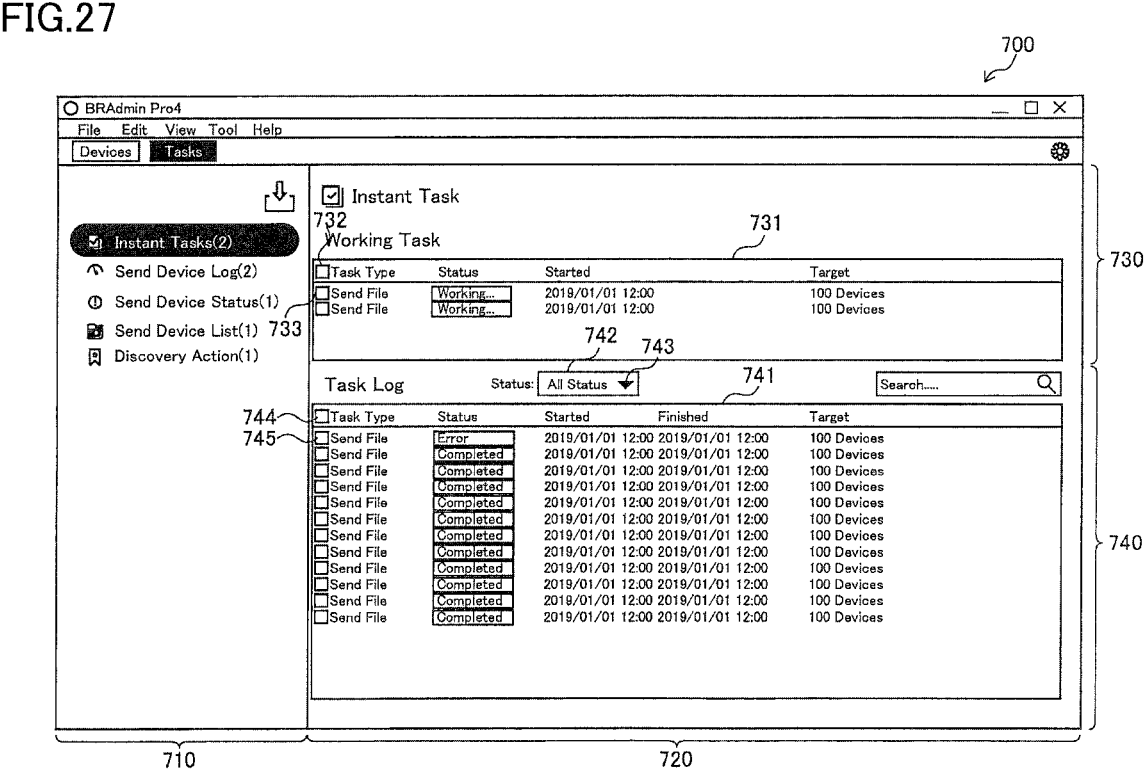
FIG. 27 is a view of one example of a task screen.

When the user presses the task button 502 on the HOME screen 500 in FIG. 23, this HOME screen 500 is switched to a task screen. FIG. 27 illustrates one example of a task screen 700.

The task screen 700 contains a left pane 710 and a center pane 720. The center pane 720 contains an upper pane 730 and a lower pane 740.

The left pane 710 is a region for displaying a list of types of tasks being set (a task-type list). In the illustrated example, two tasks belonging to the category of the instant task and five tasks belonging to the category of the scheduled task are displayed.

The center pane 720 is a region for displaying an operating status of one of the task types which is selected from the task-type list displayed on the left pane 710. The upper pane 730 displays information relating to a working task ("Working Task"), and the lower pane 740 displays a task log ("Task Log").

The upper pane 730 contains a working-task list region 731 for displaying a list of the working tasks. In the example in FIG. 27, since the instant task is selected from the task-type list displayed on the left pane 710, instant working tasks are displayed on the working-task list region 731. Display items for the instant task include a type of a task ("Task Type"), a status ("Status"), a start date and time of the task ("Started"), and the number of target MFPs 200 ("Target"). It should be noted that these display items are one example, and other items may be displayed.

The item "Task Type" is displayed when the instant task is selected, and is not displayed when another task is selected, that is, when any of "Send Device Log (2)", "Send Device Status (1)", "Send Device List (1)", and "Discovery Action (1)" is selected in the illustrated example. This is because the instant task is a general term, and each of the other tasks is the name of the individual task. That is, this is because the tasks belonging to the instant task include a plurality of types such as "Firmware Update" as illustrated in FIG. 21 (seven types in the illustrated example). Thus, in the case where the general term is used for any other task such as the scheduled task, the display items include "Task Type".

A left end of the working-task list region 731 contains check boxes 732, 733 of two types. The uppermost check box 732 can collectively change a selected or unselected state for all the check boxes 733 provided for the respective tasks being operated. Each of the check boxes 733 can individually change the selected or unselected state for a corresponding one of the tasks being operated.

The lower pane 740 contains a task-log region 741 for displaying task logs. The lower pane 740 contains a status-selection combo box 742 similar to the status-selection combo box 521 illustrated in FIG. 10. Since each of finished tasks displayed on the task-log region 741 has a status (Status), when the user selects one of the statuses from a drop-down list, not illustrated, that is displayed by pressing a drop-down button 743 provided on a right end of a selection combo box 742, when only the finished task or tasks having the selected status are displayed on the task-log region 741. In the example in FIG. 27, "All Status" is selected as the status, and accordingly all the finished tasks are displayed on the task-log region 741.

Two types of check boxes 744, 745 are provided on a left end of the task-log region 741. The functions of the respective check boxes 744, 745 are similar to those of the respective check boxes 732, 733, and an explanation thereof is dispensed with.

Figure 28:
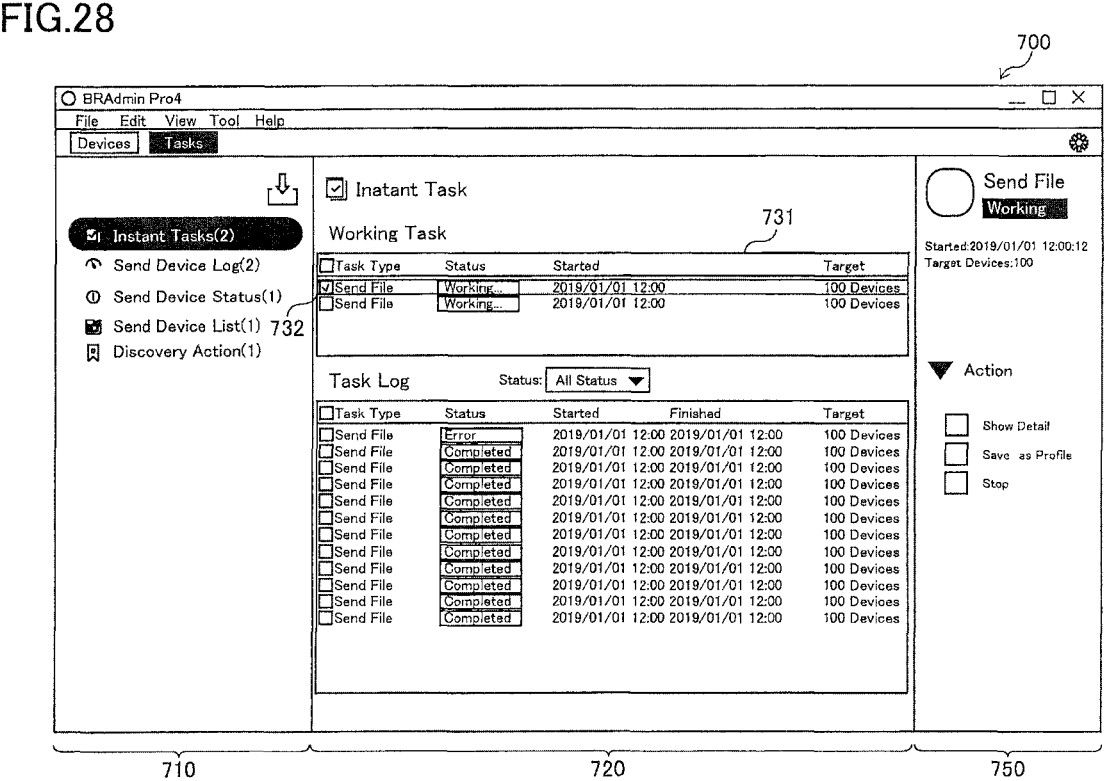
FIG. 28 is a view of one example of a task screen in the case where the uppermost one of working tasks displayed on a working-task list region is selected on the task screen in FIG. 27.

When the user selects an upper one of the two working tasks displayed on the working-task list region 731 on the task screen 700 in FIG. 27, as illustrated in FIG. 28, the check box 732 is checked. In response, a right pane 750 is displayed on the task screen 700.

The right pane 750 is a region for displaying (i) information relating to the selected working task and (ii) a type of action for the working task.

Specifically, examples of the information relating to the working task include a type of a task ("Send File"), a status ("Working"), the start date and time ("Started: 2019/01/01 12:00:12"), the number of the MFPs 200 for the task (Target Devices: 100).

The type of the action includes three type: "Show Detail"; "Save as Profile"; and "Stop".

Figure 29:
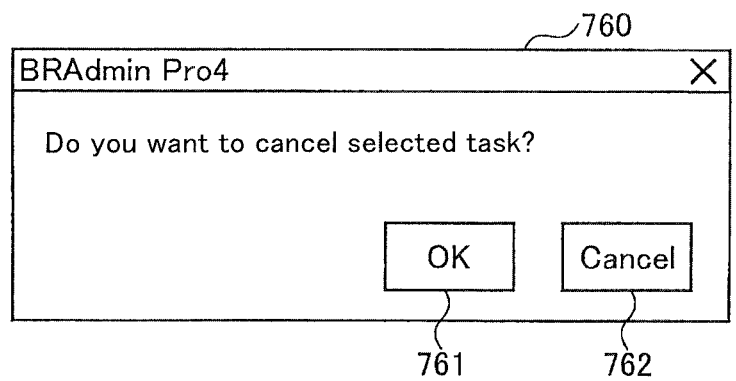
FIG. 29 is a view of one example of a reconfirmation window.

When the user presses "Stop" as one action on the task screen 700 in FIG. 28, a reconfirmation window is popped up. FIG. 29 illustrates one example of a reconfirmation window 760.

The reconfirmation window 760 contains an OK button 761 and a Cancel button 762 with a reconfirmation message "Do you want to cancel selected task?". The user presses the OK button 761 to perform a cancel instruction. The user presses the Cancel button 762 to cancel the cancel instruction.

Figure 30:
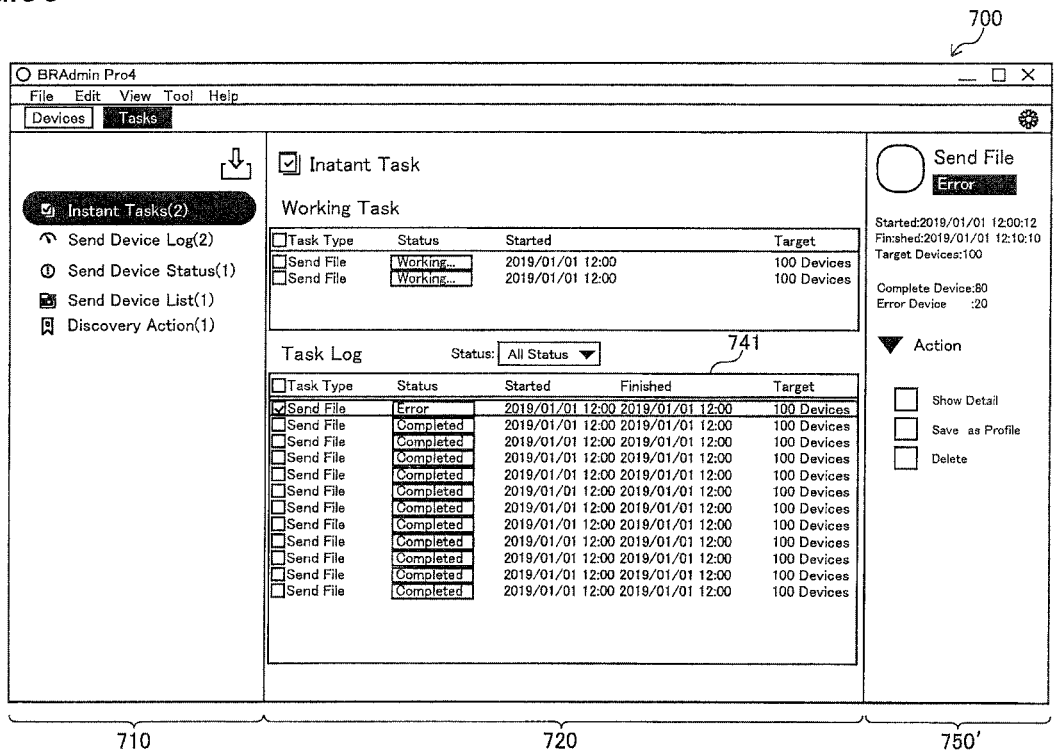
FIG. 30 is a view of one example of a task screen displayed when the uppermost one of finished tasks displayed on a task-log region is selected on the task screen in FIG. 27.

When the user selects the uppermost one of the finished tasks displayed on the task-log region 741 on the task screen 700 in FIG. 27, that is, when the user selects the finished task with a status "Error", as illustrated in FIG. 30, a check box 745 is checked. In response, a right pane 750' is displayed on the task screen 700.

The right pane 750' is a region for displaying (i) information relating to the selected finished task and (ii) a type of action for the finished task.

Specifically, examples of the information relating to the finished task include a type of a task ("Send File"), a status ("Error"), the start date and time ("Started: 2019/01/01 12:00:12"), the finished date and time ("Finished: 2019/01/01 12:10:10"), the number of the MFPs 200 for the task (Target Devices: 100), the number of the MFPs 200 for which the task is finished normally (Complete Devices: 80), and the number of the MFPs 200 for which the task is finished erroneously (Error Devices: 20).

The type of the action includes three types: "Show Detail"; "Save as Profile"; and "Delete".

Figure 31:
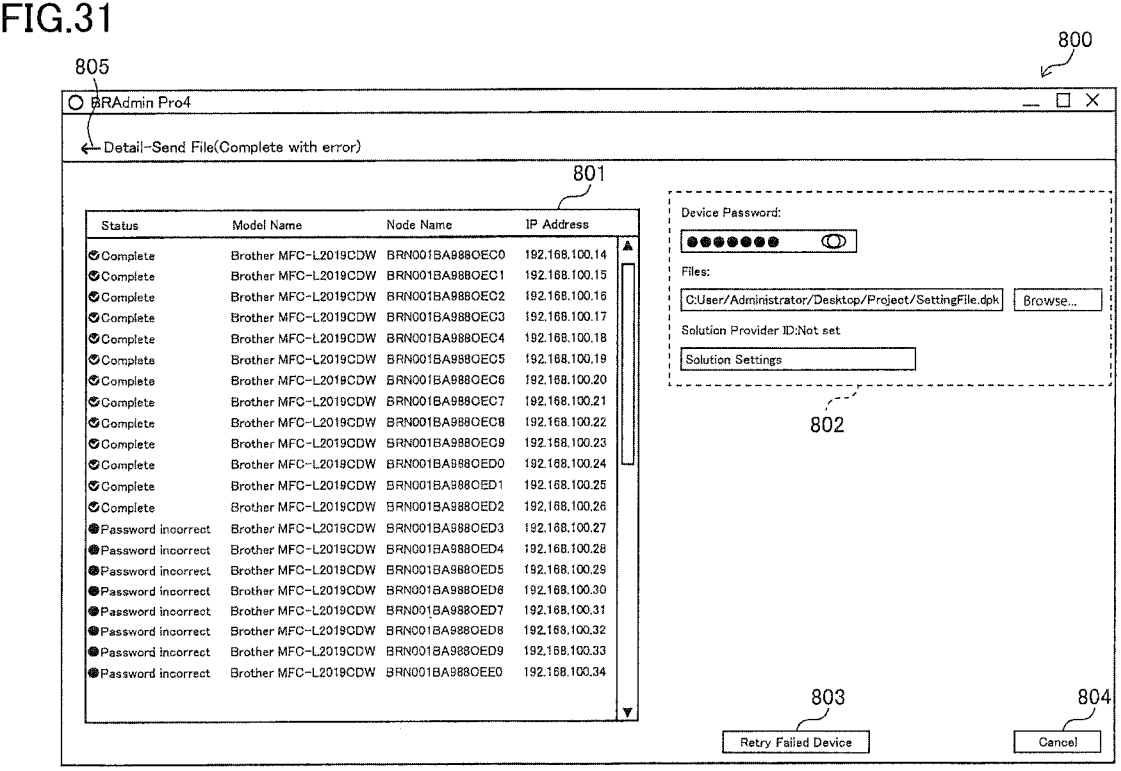
FIG. 31 is a view of one example of a task-detail screen.

When the user presses "Show Detail" as one action on the task screen 700 in FIG. 30, the task screen 700 is switched to a task-detail screen. FIG. 31 illustrates one example of a task-detail screen 800.

The task-detail screen 800 contains: a detail display region 801 for displaying detailed contents of the selected finished task; a Retry ("Retry Failed Device") button 803; a Cancel button 804; and an arrow indication 805.

The task-detail screen 800 is a detailed screen for tasks whose task type is "Send Files". Thus, the task-detail screen 800 is created by using the task setting screen "Send Files", i.e., the above-described task setting screen 600 in FIG. 22. Accordingly, the task-detail screen 800 contains an input box contained in a region 802 on the task-detail screen 800. However, since an input operation cannot be performed into the input box, the input box contained in the region 802 is grayed out. FIG. 31 illustrates the input box not grayed out for convenience of the illustration.

When the user presses the Retry button 803 on the task-detail screen 800, the task-detail screen 800 is switched to a task setting screen similar to the task setting screen 600. Unlike the task setting screen 600, only the MFP 200 finished erroneously is selected and input in the transmission-destination-list region 601 on the switched task setting screen. This switched task setting screen enables the user to perform the task "Send Files" again.

Password Setting Processing

Figure 32:
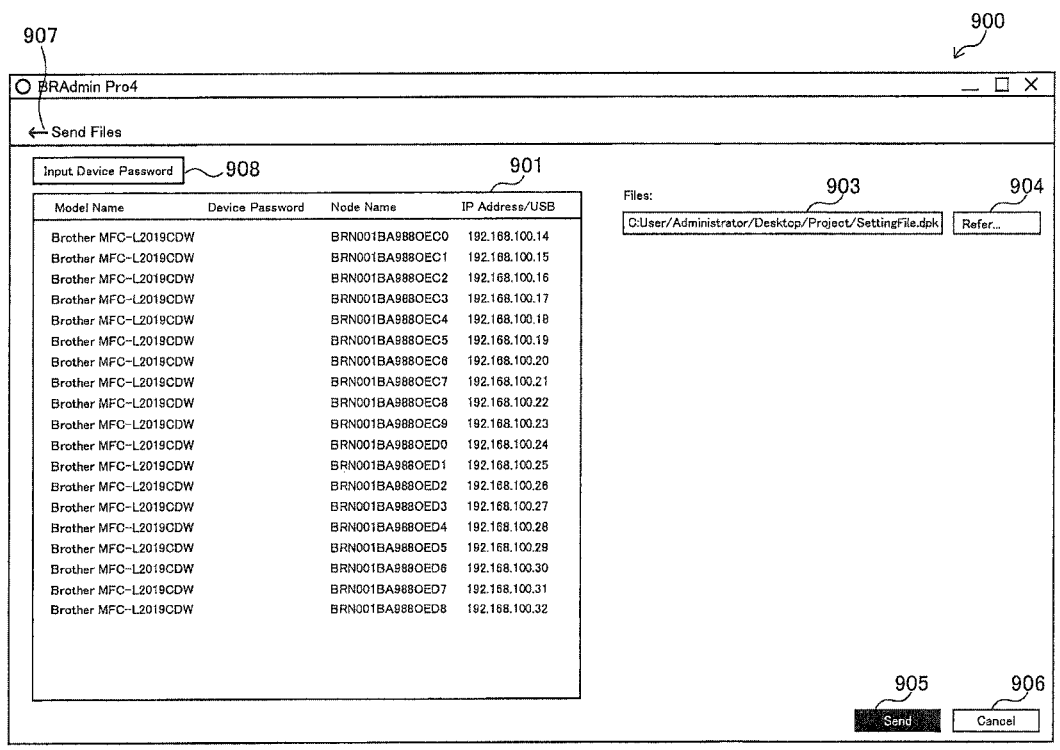
FIG. 32 is a view of one example of a task setting screen.

FIG. 32 illustrates one example of a task setting screen 900. This task setting screen 900 is for setting the task "Send Files" but described for explaining a password setting processing. Thus, a password is unset on the task setting screen 900.

The task setting screen 900 contains: a transmission-destination-list region 901 for displaying a list of the MFPs 200 to which a file is to be transmitted; a file-designation box 903 for designation of the file to be transmitted; and a button 904 for calling the above-described application for browsing and searching for the file. The task setting screen 900 further contains: a Send button 905 for instructing transmission of the file; a Cancel button 906 for canceling a setting; and a password-input request ("Input Device Password") button 908 for displaying an operating symbol and a password input box for input of a password. An arrow indication 907 is an operating symbol for instructing a return to the previous screen.

Figure 33:
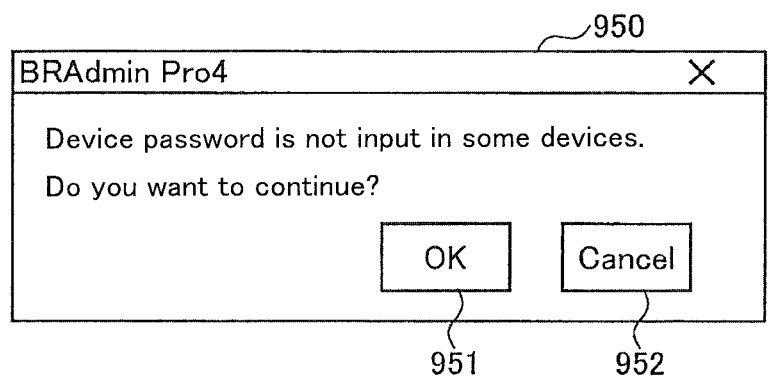
FIG. 33 is a view of one example of a warning window.

The transmission-destination-list region 901 contains a password input field ("Device Password"). In the example in FIG. 32, the password input field is blank. When the user presses the Send button 905 in the state in which the password input field is blank, a warning window is popped up. FIG. 33 illustrates one example of a warning window 950.

The warning window 950 contains an OK button 951 and a Cancel button 952 with a warning message "Device password is not input in some devices. Do you want to continue?". The user presses the OK button 951 to perform a file transmitting instruction. The user presses the Cancel button 952 to cancel the file transmitting instruction.

Figure 34:
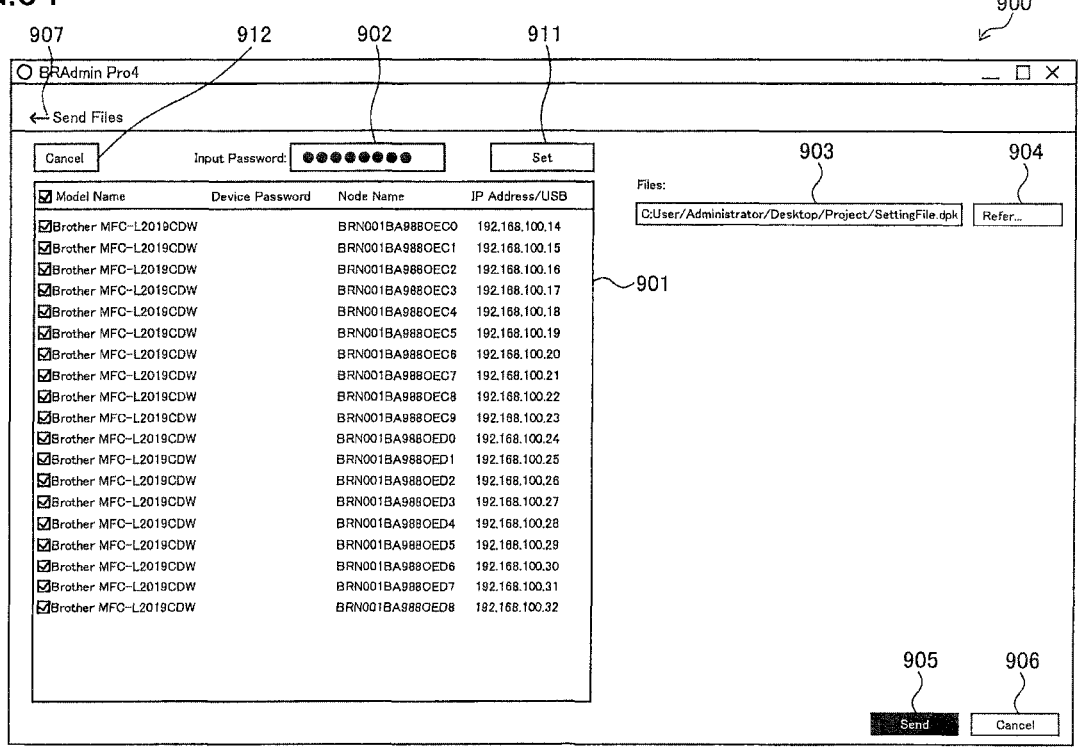
FIG. 34 is a view of one example of a task setting screen in the case where a password input box is displayed in response to pressing of a password-input request button on the task setting screen in FIG. 32.

FIG. 34 illustrates one example of the task setting screen 900 in the case where the password-input request button 908 is pressed, and a password-input box 902 is displayed. In the example in FIG. 34, however, since a password has already been displayed on the password-input box 902, the task setting screen 900 in FIG. 34 is established after a state in which the password-input box 902 is blank (a state before the password is input).

The task setting screen 900 in FIG. 34 further contains: a Set button 911 for setting a password input to the password-input box 902, by batch, to all the MFPs 200 displayed on the transmission-destination-list region 901; and a Cancel button 912 for canceling the setting. When the password-input box 902 is displayed, designation of a file to be transmitted and transmission of a file are inhibited, the file-designation box 903 and the buttons 904-906 are grayed out. In FIG. 34, the file-designation box 903 and the buttons 904-906 are not grayed out for convenience of the illustration.

In the case where the task setting screen 900 in FIG. 32 is switched to the task setting screen 900 in FIG. 34, check boxes having been checked are displayed for the respective MFPs 200 displayed on the transmission-destination-list region 901 in list form. The task setting screen 900 in FIG. 34 is a task setting screen in a password batch setting mode. Thus, in the case where the task setting screen 900 in FIG. 32 is switched to the task setting screen 900 in FIG. 34, the MFPs 200 displayed on the transmission-destination-list region 901 in list form on the task setting screen 900 in FIG. 32 are displayed in a selected state in the default setting. In the case where the user wants to cancel the selected state for some of all the MFPs 200 displayed in the selected state, the user at least needs to turn off the checks in corresponding check boxes.

Figure 35:
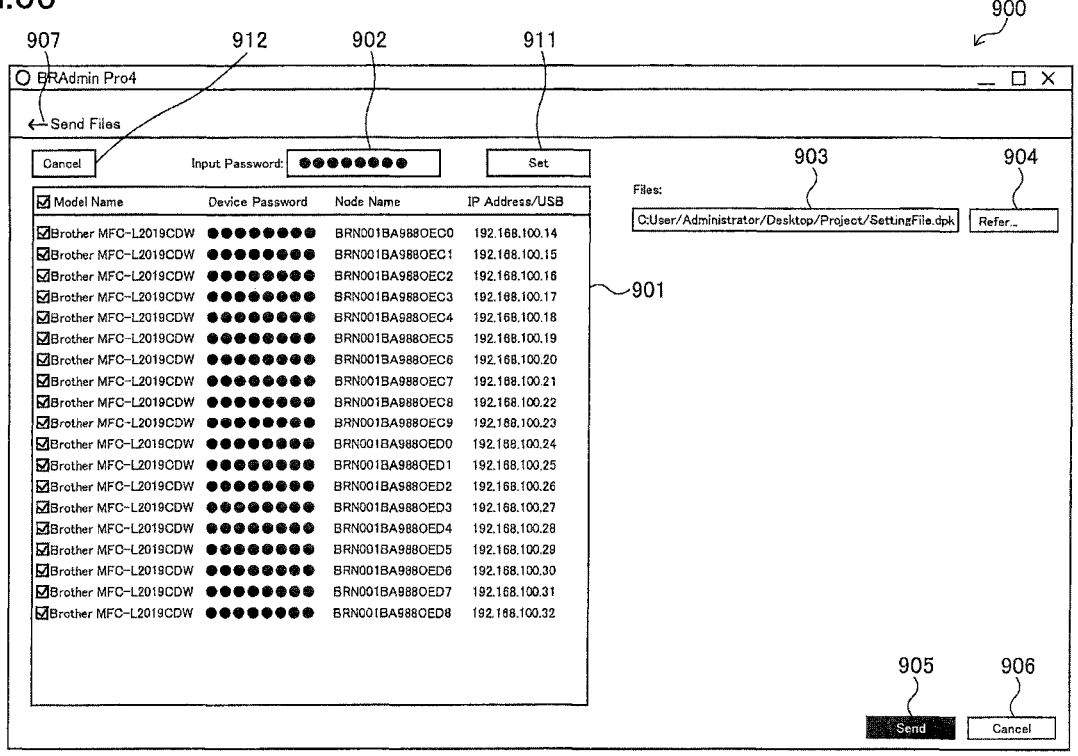
FIG. 35 is a view of one example of a task setting screen displayed after a setting button is pressed by a user on the task setting screen in FIG. 34.

As illustrated in FIG. 34, when the user presses the Set button 911 in a state in which a password is input to the password-input box 902, as illustrated in FIG. 35, the input password is temporarily set by batch to all the MFPs 200 displayed on the transmission-destination-list region 901. Here, the temporary setting means that the input password and each of the MFPs 200 are merely associated with each other on the PC 100, and the input password is not actually set to each of the MFPs 200. On the task setting screen 900 in FIG. 35, the file-designation box 903 and the buttons 904-906 are also grayed out.

Figure 36:
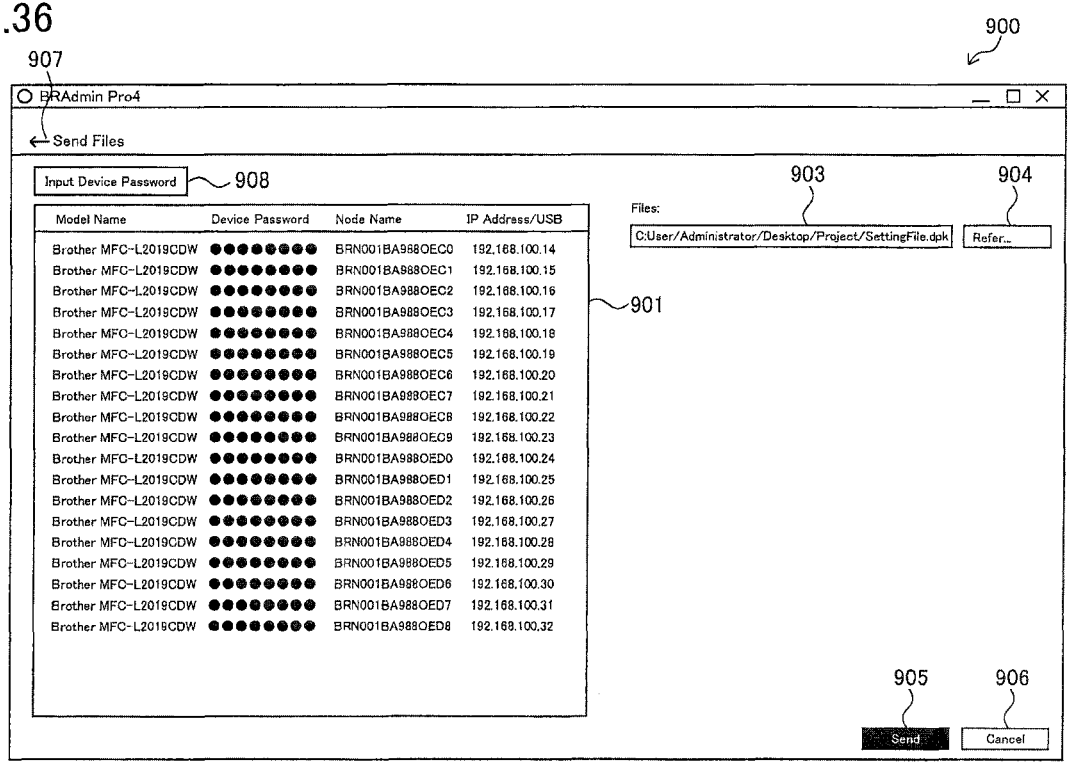
FIG. 36 is a view of one example of a task setting screen displayed after a Send button is pressed by the user on the task setting screen in FIG. 35.

FIG. 36 illustrates the task setting screen 900 displayed after the user presses the Send button 905 on the task setting screen 900 in FIG. 35. That is, when the Send button 905 is pressed, the password having been temporarily set and the file designated in the file-designation box 903 are transmitted together to a plurality of the MFPs 200. Thus, the task setting screen 900 in FIG. 36 is different from the task setting screen 900 in FIG. 32 in that a password is set for each of all the MFPs 200 displayed on the transmission-destination-list region 901.

It is noted that the Send button 905 becomes pressable when the Set button 911 or the Cancel button 912 is pressed on the task setting screen 900 in FIG. 35, the password-input box 902 disappears, and the password-input request button 908 is displayed.

Figure 37:
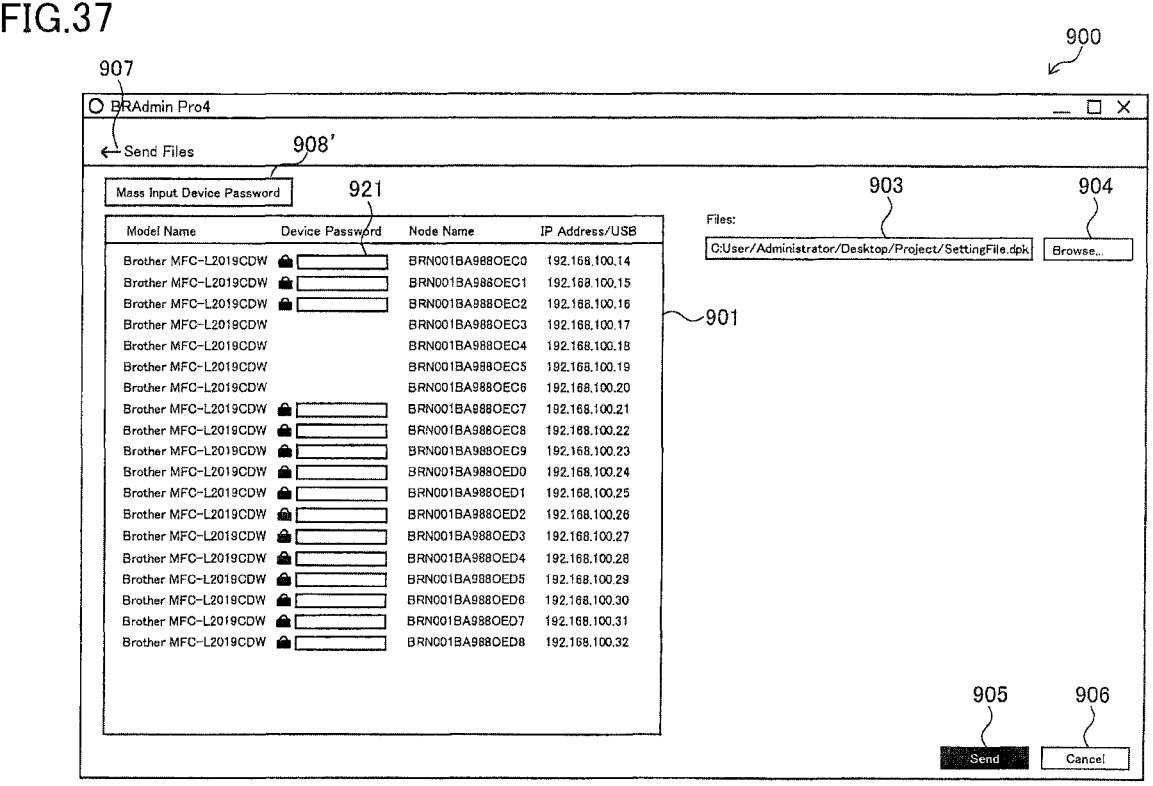
FIG. 37 is a view illustrating setting of passwords individually for the MFPs displayed on a transmission-destination-list region of the task setting screen.

FIG. 37 illustrates a situation in which a password is individually set to each of the MFPs 200 displayed on the transmission-destination-list region 901 of the task setting screen 900. As illustrated in FIG. 37, an icon of a key shape is displayed on the transmission-destination-list region 901 for each of the MFPs 200 which requires a password, and an individual-password input box 921 is displayed next to the icon. The user designates the individual-password input boxes 921 one by one and inputs a password to each of the individual-password input boxes 921.

The task setting screen 900 in FIG. 37 further contains a password-mass-input request ("Mass Input Device Password") button 908'. When the password-mass-input request button 908' is pressed by the user, as on the task setting screen 900 in FIG. 34, the password-input box 902, the Set button 911, and the Cancel button 912 are displayed instead of the password-mass-input request button 908'.

Effects

As described above, the non-transitory storage medium stores a plurality of instructions executable by a processor of the PC 100 configured to communicate with the MFP 200. The PC 100 includes the communication interface 160 and the database 154. The plurality of instructions, when executed by the processor, cause the PC 100 to execute: the determination processing (S1, S2) in which the PC 100 determines whether there is the device list in the database 154 at the initial start of the PC 100, the device list being a list of at least one MFP 200; the search processing (S11, S14) in which the PC 100 searches for the MFP 200 communicable with the PC 100 when the PC 100 determines in the determination processing that there is no device list in the database 154 (S1 or S2: NO); and the creation processing (S12) in which the PC 100 creates the device list based on a result of the search processing.

This configuration makes it possible to search for the MFP 200 at an optimum timing to efficiently create the device list.

In the present embodiment, the MFP 200 is one example of a function executing device. The communication interface 160 is one example of a communication device. The PC 100 is one example of a communication apparatus.

Examples of the initial start include at least one of the first start of the PC 100 after a setting of the configuration of the information processing program, the first start of the PC 100 after an update of software of the information processing program, and the first start of the PC 100 after deletion of the database 154.

With this configuration, the PC 100 determines whether the device list is present, at an initial start with a high possibility that no device list is present in the database 154. This makes it possible to further efficiently create the device list.

When the database 154 is accessible via the platform (S1: YES), the PC 100 determines in the determination processing via the platform whether there is the device list in the database 154. When the PC 100 determines in the determination processing that there is not the device list in the database 154 (S1: NO), the PC 100 searches for the MFP 200 in the search processing not via the platform but via another route (S14).

This makes it possible to search for the MFP 200 while effectively using the platform.

The PC 100 includes the display. When there are a plurality of the device lists in the database 154 (S6: NO), the PC 100 executes the display processing (S9) in which the PC 100 controls the display 120 to display the device-list selection screen for selection of any of the device lists.

This enables the user to select a desired device list in advance.

When there are a plurality of databases each containing the device list (S3: YES), the PC 100 controls the display 120 in the display processing to display the database-selection screen for selection of any of the databases (S4).

This enables the user to select a desired database in advance.

When the PC 100 determines in the determination processing that there is the device list in the database 154, the PC 100 executes the update processing (S8) in which the PC 100 updates information relating to the MFP 200 on the device list, without searching for the MFP 200 in the search processing (S11, S14).

This makes it possible to effectively use the device list in the database 154.

What is claimed is:

1. A non-transitory storage medium storing a plurality of instructions executable by a processor of a communication apparatus configured to communicate with a function executing device, the communication apparatus comprising a communication device and a database,
   the plurality of instructions, when executed by the processor, causing the communication apparatus to execute
      a first determination processing, in which the communication apparatus determines whether the database is accessible via a background service,
      a second determination processing, in which the communication apparatus determines whether there is a device list in the database at an initial start of the communication apparatus, the device list being a list of at least one function executing device,
      a first search processing, in which the communication apparatus searches for the function executing device communicable with the communication apparatus by calling a business logic layer when it is determined in the first determination processing that the database is not accessible via the background service,
      a second search processing, in which the communication apparatus searches for the function executing device communicable with the communication apparatus via the background service when it is determined in the first determination processing that the database is accessible via the background service and it is determined in the second determination processing that the device list is not in the database, and
      a creation processing, in which the communication apparatus creates the device list based on a result of the search processing,
   wherein, when it is determined that the database is accessible via the background service in the first determination processing, and it is determined that the device list is in the database in the second determination processing, the plurality of instructions cause the communication apparatus not to search for an additional function executing device so as to execute updating the device list, in which information of the function executing device included in the device list is updated, and not to add an additional function executing device into the device list in the creation processing, the additional function executing device not being included in the device list.

2. The non-transitory storage medium according to claim 1, wherein the device list contains at least one function executing device each as the function executing device communicable with the communication apparatus.

3. The non-transitory storage medium according to claim 1, wherein the initial start is any of at least one of a first start after a setting of a configuration of the plurality of instructions, a first start after a completion of an update of software of the plurality of instructions, and a first start after deletion of the database.

4. The non-transitory storage medium according to claim 1, wherein the communication apparatus comprises a display, and
   wherein the plurality of instructions, when executed by the processor, cause the communication apparatus to, when there are a plurality of device lists in the database, execute a display processing in which the communication apparatus controls the display to display a device-list selection screen for selection of any of the plurality of device lists.

5. The non-transitory storage medium according to claim 4, wherein the plurality of instructions, when executed by the processor, cause the communication apparatus to, when there are a plurality of databases each containing the device list, control the display in the display processing to display a database-selection screen for selection of any of the plurality of databases.

6. A communication apparatus, comprising:
   a communication device configured to communicate with a function executing device;
   a database; and
   a controller configured to execute
      a first determination processing, in which the controller determines whether the database is accessible via a background service,
      a second determination processing, in which the controller determines whether there is a device list in the database at an initial start of the communication apparatus, the device list being a list of at least one function executing device,
      a first search processing, in which the controller searches for the function executing device communicable with the communication device by calling a business logic layer when it is determined in the first determination processing that the database is not accessible via the background service,
      a second search processing, in which the controller searches for the function executing device communicable with the communication apparatus via the background service when it is determined in the first determination processing that the database is accessible via the background service and it is determined in the second determination processing that the device list is not in the database, and a creation processing, in which the controller creates the device list based on a result of the search processing, wherein, when it is determined that the database is accessible via the background service in the first determination processing, and it is determined that the device list is in the database in the second determination processing, the controller does not search for an additional function executing device so as to execute updating the device list, in which information of the function executing device included in the device list is updated, and does not add an additional function executing device into the device list in the creation processing, the additional function executing device not being included in the device list.

7. The communication apparatus according to claim 6, wherein the device list contains at least one function executing device each as the function executing device communicable with the communication apparatus.

8. The communication apparatus according to claim 6, wherein the initial start is any of at least one of a first start after a setting of a configuration of the plurality of instructions, a first start after a completion of an update of software of a plurality of instructions stored in the communication apparatus, and a first start after deletion of the database.

9. The communication apparatus according to claim 6, wherein the communication apparatus comprises a display, and wherein the controller is configured to, when there are a plurality of device lists in the database, execute a display processing in which the controller controls the display to display a device-list selection screen for selection of any of the plurality of device lists.

10. The communication apparatus according to claim 9, wherein the controller is configured to, when there are a plurality of databases each containing the device list, control the display in the display processing to display a database-selection screen for selection of any of the plurality of databases.

11. A list creating method for a communication apparatus configured to communicate with a function executing device, the communication apparatus comprising a communication device and a database, the list creating method comprising:

determining whether the database is accessible via a background service;

determining whether a device list is in the database at an initial start of the communication apparatus, the device list being a list of at least one function executing device;

searching for the function executing device communicable with the communication apparatus by calling a business logic layer when it is determined that the database is not accessible via the background service;

searching for the function executing device communicable with the communication apparatus via the background service when it is determined that the database is accessible via the background service and it is determined that the device list is not in the database; and creating the device list based on a result of the searching, wherein, when it is determined that the database is accessible via the background service and it is determined that the device list is in the database, searching for an additional function executing device is not executed so as to execute updating of the device list in which information of the function executing device included in the device list is updated, and creating the device list in which an additional function executing device is added into the device list is not executed, the additional function device not being listed in the device list is not executed.

12. The list creating method according to claim 11, wherein the device list contains at least one function executing device each as the function executing device communicable with the communication apparatus.

13. The list creating method according to claim 11, wherein the initial start is any of at least one of a first start after a setting of a configuration of the plurality of instructions, a first start after a completion of an update of software of the plurality of instructions, and a first start after deletion of the database.

14. The list creating method according to claim 11, wherein the communication apparatus comprises a display, and wherein the list creating method further comprises displaying a device-list selection screen on the display when there are a plurality of device lists in the database, the device-list selection screen being for selection of any of the plurality of device lists.

15. The list creating method according to claim 14, wherein the displaying the device-list selection screen comprises displaying a database-selection screen for selection of any of the plurality of databases, when there are a plurality of databases each containing the device list.

\* \* \* \* \*